(12) United States Patent
Yun et al.

(10) Patent No.: US 12,009,592 B2
(45) Date of Patent: Jun. 11, 2024

(54) ANTENNA SYSTEM MOUNTED ON VEHICLE

(71) Applicant: LG ELECTRONICS INC., Seoul (KR)

(72) Inventors: Changwon Yun, Seoul (KR); Kangjae Jung, Seoul (KR); Jaewoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 178 days.

(21) Appl. No.: 17/757,006

(22) PCT Filed: Dec. 18, 2019

(86) PCT No.: PCT/KR2019/017968
§ 371 (c)(1),
(2) Date: Jun. 7, 2022

(87) PCT Pub. No.: WO2021/125383
PCT Pub. Date: Jun. 24, 2021

(65) Prior Publication Data
US 2023/0012197 A1 Jan. 12, 2023

(51) Int. Cl.
*H01Q 1/32* (2006.01)
*H01Q 1/22* (2006.01)
(Continued)

(52) U.S. Cl.
CPC ........... *H01Q 13/16* (2013.01); *H01Q 1/2291* (2013.01); *H01Q 1/3275* (2013.01); *H01Q 1/38* (2013.01);
(Continued)

(58) Field of Classification Search
CPC .... H01Q 13/16; H01Q 1/2291; H01Q 1/3275; H01Q 1/38; H01Q 1/50; H01Q 5/20; H01Q 5/307; H01Q 1/36; H01Q 1/521; H01Q 5/378; H01Q 19/005; H01Q 21/061; H01Q 21/28; H04B 7/0413; H04B 7/0404; H04L 5/00; H04L 5/0001
See application file for complete search history.

(56) References Cited

U.S. PATENT DOCUMENTS 5,691,732 A * 11/1997 Tsuru ................... H01Q 9/0421
343/702
10,582,608 B2 * 3/2020 Rengarajan .......... H01Q 1/3233
(Continued)

FOREIGN PATENT DOCUMENTS

JP 10190345 7/1998
JP 10200327 7/1998

OTHER PUBLICATIONS

PCT International Application No. PCT/KR2019/017968, International Search Report dated Sep. 17, 2020, 2 pages.

*Primary Examiner* — David E Lotter
(74) *Attorney, Agent, or Firm* — LEE, HONG, DEGERMAN, KANG & WAIMEY

(57) ABSTRACT

Provided is an antenna system mounted on a vehicle according to the present invention. The antenna system comprises: a first printed circuit board (PCB) having a metal pattern and a dielectric region; a second PCB on which a plurality of antennas are disposed; and a slot antenna configured to radiate a signal through a slot region formed adjacent to a junction portion of the first PCB and the second PCB.

16 Claims, 13 Drawing Sheets

(51) Int. Cl.
  *H01Q 1/38*  (2006.01)
  *H01Q 1/50*  (2006.01)
  *H01Q 5/20*  (2015.01)
  *H01Q 5/307*  (2015.01)
  *H01Q 13/16*  (2006.01)

(52) U.S. Cl.
  CPC ................ *H01Q 1/50* (2013.01); *H01Q 5/20* (2015.01); *H01Q 5/307* (2015.01)

(56) References Cited

U.S. PATENT DOCUMENTS

| | | |
|---|---|---|
| 2018/0027647 A1 | 1/2018 | Rengarajan et al. |
| 2019/0288399 A1 | 9/2019 | Tanaka et al. |

\* cited by examiner

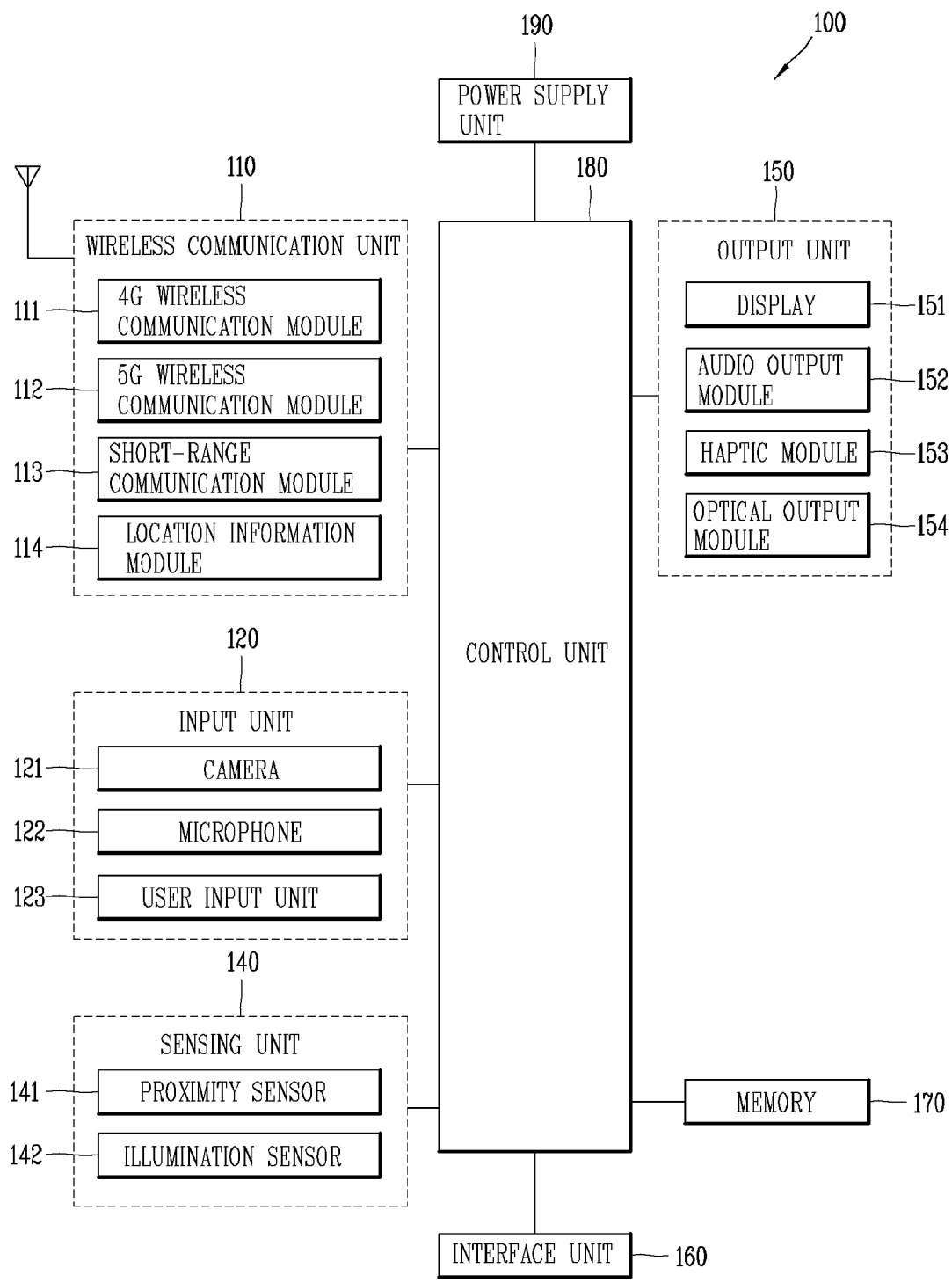

ANTENNA SYSTEM MOUNTED ON VEHICLE

CROSS-REFERENCE TO RELATED APPLICATION(S)

This application is the National Stage filing under 35 U.S.C. 371 of International Application No. PCT/KR2019/017968, filed on Dec. 18, 2019, the contents of which are all incorporated by reference herein in their entirety.

TECHNICAL FIELD

The present disclosure relates to an antenna system mounted in a vehicle. One particular implementation relates to an antenna system having a broad band that is capable of operating in various communication systems, and to a vehicle having the same.

BACKGROUND ART

Electronic devices may be classified into mobile/portable terminals and stationary terminals according to mobility. Also, the electronic devices may be classified into handheld types and vehicle mount types according to whether or not a user can directly carry.

Functions of electronic devices are diversifying. Examples of such functions include data and voice communications, capturing images and video via a camera, recording audio, playing music files via a speaker system, and displaying images and video on a display. Some electronic devices include additional functionality which supports electronic game playing, while other terminals are configured as multimedia players. Specifically, in recent time, mobile terminals can receive broadcast and multicast signals to allow viewing of video or television programs As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated to provide 5G communication services.

In this regard, the mobile terminal may be configured to provide 5G communication services in various frequency bands. Recently, attempts have been made to provide 5G communication services using a Sub-6 band under a 6 GHz band. In the future, it is also expected to provide 5G communication services by using a millimeter-wave (mm-Wave) band in addition to the Sub-6 band for a faster data rate.

Recently, the necessity of providing such a communication service through a vehicle is increasing. Meanwhile, there is a need for a fifth generation (5G) communication service, which is a next generation communication service, as well as existing communication services such as LTE (Long Term Evolution) and the like in relation to communication services.

Accordingly, broadband antennas operating in both the LTE frequency bands and the 5G Sub6 frequency bands need to be disposed in a vehicle other than an electronic device. However, broadband antennas such as cone antennas have problems in that a vertical profile and a weight increase due to an increase in an overall antenna size, particularly, a height.

In addition, the broadband antennas such as the cone antennas may be implemented in a three-dimensional structure compared to related art planar antennas. In addition, multiple-input/multi-output (MIMO) should be implemented in an electronic device or vehicle to improve communication reliability and communication capacity. To this end, it is necessary to arrange a plurality of broadband antennas in the electronic device or vehicle.

It is also necessary to improve antenna performance while maintaining a low-profile structure in the antenna system. However, in the three-dimensional antenna system, a mechanical structure for fixing the antenna in a vehicle is required while securing a height of an antenna itself. This may cause a problem that the antenna performance should be improved while maintaining the mechanical structure to be equal to or lower than a predetermined height.

Furthermore, when such an antenna system is disposed in a vehicle, it is necessary to provide a plurality of antennas operating in different bands. In this case, when the antennas operating in the different bands are implemented on the same plane, an increase in an antenna arrangement space may be caused. This may bring about an insufficient space for mounting the antenna system including the plurality of antennas in the vehicle.

DISCLOSURE OF INVENTION

Technical Problem

The present disclosure is directed to solving the aforementioned problems and other drawbacks. The present disclosure also describes performance improvement of an antenna system while maintaining a height of the antenna system mounted in a vehicle to be lower than or equal to a predetermined level.

The present disclosure further describes a structure for mounting an antenna system, which is capable of operating in a broad frequency band to support various communication systems, to a vehicle.

The present disclosure further describes a method for implementing an additional antenna by utilizing an existing space without extending a separate antenna space.

The present disclosure further describes an antenna configuration capable of operating as broadband antenna in a low band (LB).

Solution to Problem

To achieve these and other advantages and in accordance with the purpose of this specification, as embodied and broadly described herein, there is provided an antenna assembly mounted on a vehicle. The antenna system may include a first printed circuit board (PCB) having a metal pattern and a dielectric region, a second PCB on which a plurality of antennas are disposed, and a slot antenna configured to radiate a signal through a slot region generated adjacent a junction portion between the first PCB and the second PCB.

In one implementation, the slot region of the slot antenna may be defined perpendicular to the first PCB and the second PCB.

In one implementation, the slot antenna may include a plurality of slot antennas separated by a second metal pattern that vertically connects a metal pattern of the first PCB and a metal pattern of the second PCB.

In one implementation, the slot antenna may include a first slot antenna disposed in a first slot region defined at one side of the second metal pattern, and a second slot antenna disposed in a second slot region defined at another side of the second metal pattern.

In one implementation, the first slot antenna may include a first filter part configured to connect one end portion of the metal pattern of the first PCB and one end portion of the metal pattern of the second PCB. Also, the first slot antenna may further include a first feeder configured to feed the first slot region at one point between the first filter part and the second metal pattern.

In one implementation, the second slot antenna may include a second filter part configured to connect another end portion of the metal pattern of the first PCB and another end portion of the metal pattern of the second PCB. Also, the second slot antenna may further include a second feeder configured to feed the second slot region at one point between the second filter part and the second metal pattern.

In one implementation, each of the first and second filter parts may include an inductor configured to connect the one end portion of the metal pattern of the first PCB and the one end portion of the metal pattern of the second PCB. Also, each of the first and second filter parts may further include a capacitor configured to connect the one end portion of the metal pattern of the first PCB and the one end portion of the metal pattern of the second PCB.

In one implementation, the antenna system may further include a transceiver circuit configured to control a signal to be radiated through at least one of the first slot antenna and the second slot antenna. The antenna system may further include a baseband processor cooperatively coupled to the transceiver circuit and configured to control an operating frequency band of the slot antenna through the transceiver circuit.

In one implementation, the baseband processor may control one of the inductor and the capacitor to be connected between the metal pattern of the first PCB and the metal pattern of the second PCB, so that the slot antenna resonates in a first WiFi band or a second WiFi band.

In one implementation, the first PCB may be implemented as a flexible printed circuit board (FPCB). The FPCB may include a first low-band (LB) antenna and a second LB antenna configured to operate in a first band that is a low band.

In one implementation, the transceiver circuit may radiate a signal in the first band through at least one of the first LB antenna and the second LB antenna.

In one implementation, the baseband processor may be cooperatively coupled to the transceiver circuit, and configured to control the transceiver circuit to perform multiple-input and multi-output (MIMO) through the first LB antenna and the second LB antenna.

In one implementation, each of the first LB antenna and the second LB antenna may further include a first radiator disposed inside a first dielectric region having a predetermined width and length, and a second radiator disposed within a second dielectric region having a predetermined width and length.

In one implementation, the first radiator and the second radiator may be radiators each generated from a different side surface of the metal pattern to have a predetermined width and length. Therefore, the first radiator and the second radiator formed in a symmetrical shape from the different side surfaces can improve isolation between the first LB antenna and the second LB antenna.

In one implementation, an end portion of the first radiator may be spaced apart from an end portion of the first dielectric region by a predetermined distance. An end portion of the second radiator may be spaced apart from an end portion of the second dielectric region by a predetermined distance.

In one implementation, the antenna system may further include a Remote Keyless Entry (RKE) antenna disposed to be spaced apart from the metal pattern of the first PCB, and having one end connected to a feeding line and another end connected to a ground to form a closed loop.

In one implementation, a plurality of cone antennas connected to the second PCB may operate as second antennas in a second band corresponding to a middle band (MB) and a high band (HB), the second band being higher than the first band.

In one implementation, each of the plurality of cone antennas may include a cone radiator having an upper aperture and a lower aperture. Each of the plurality of cone antennas may further include a metal patch disposed to be spaced apart from the cone radiator by a predetermined distance to couple a signal from the upper aperture of the cone radiator. Each of the plurality of cone antennas may further include a shorting pin configured to connect the metal patch and a lower substrate.

In one implementation, the baseband processor may control the transceiver circuit to perform MIMO through two or more of the plurality of cone antennas in the second band when quality of a signal received through the first LB antenna and the second LB antenna corresponding to first antennas is less than or equal to a threshold value.

In one implementation, the baseband processor may perform MIMO in the first band through at least one of the first LB antenna and the second LB antenna and at least one of the plurality of cone antennas.

In one implementation, the first antennas corresponding to the first LB antenna and the second LB antenna may operate as radiators in the low band that is a first frequency band, and the second antennas may operate as radiators in a second frequency band higher than the first frequency band.

In one implementation, the baseband processor may perform Carrier Aggregation (CA) using the first frequency band through at least one of the first antennas and the second frequency band through at least one of the second antennas.

Advantageous Effects of Invention

Hereinafter, technical effects of an antenna system mounted on a vehicle and a vehicle equipped with the antenna system will be described.

According to the present disclosure, a slot antenna can be advantageously implemented by using a slot region between different substrates in the antenna system.

In addition, at least one slot antenna can be advantageously implemented by utilizing an existing space without extending a separate antenna space in the antenna system mounted on the vehicle according to the present disclosure.

Also, an LB antenna with a low-profile structure can be implemented in the antenna system mounted on the vehicle.

Also, radiation efficiency can be improved while the LB antenna can operate in a broad frequency band in the antenna system mounted on the vehicle.

In addition, interference between different antennas can be reduced in the antenna system mounted on the vehicle.

According to an implementation, a structure for mounting an antenna system, which can operate in a broad frequency band, to a vehicle can be provided to support various communication systems by implementing a low band (LB) antenna and other antennas in one antenna module.

According to an implementation, the antenna system can be optimized with different antennas in the low band LB and other bands. This can result in arranging the antenna system with optimal configuration and performance in a roof frame of the vehicle.

According to the present disclosure, the antenna system of the vehicle can implement MIMO and diversity operations using a plurality of antennas in specific bands.

Further scope of applicability of the present invention will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

BRIEF DESCRIPTION OF DRAWINGS

FIG. 1 is a block diagram of an electronic device in accordance with the present disclosure.

MODE FOR THE INVENTION

Figure 2A:
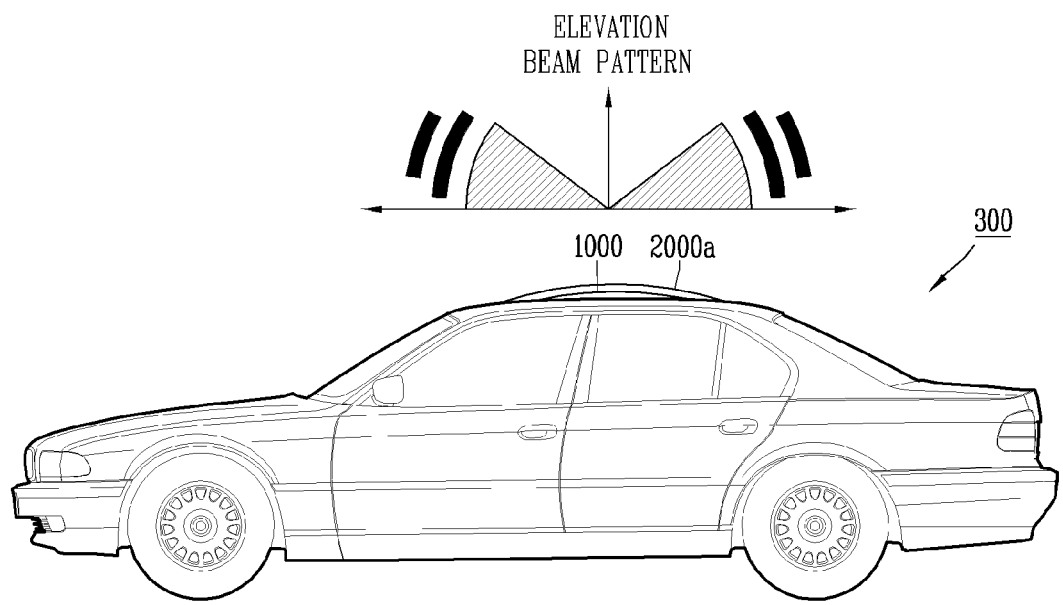
FIGS. 2A to 2C are views illustrating an example of a structure for mounting an antenna system on a vehicle, which includes the antenna system mounted on the vehicle.

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signages, and the like.

On the other hand, an antenna system mounted on a vehicle disclosed in this specification mainly refers to an antenna system disposed on an outside of the vehicle, but may also include a mobile terminal (electronic device) belonging to a user aboard the vehicle.

FIG. 1 is a block diagram of an electronic device in accordance with the present disclosure. Here, the electronic device may include a mobile terminal (electronic device) disposed inside the vehicle or carried by a user who is on board the vehicle. Also, a vehicle in which a communication system such as an antenna system is mounted may be referred to as an electronic device.

The electronic device 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components illustrated in FIG. 1 is not a requirement, and that greater or fewer components may alternatively be implemented.

In more detail, among others, the wireless communication unit 110 may typically include one or more modules which permit communications such as wireless communications between the electronic device 100 and a wireless communication system, communications between the electronic device 100 and another electronic device, or communications between the electronic device 100 and an external server. Further, the wireless communication unit 110 may typically include one or more modules which connect the electronic device 100 to one or more networks. Here, the one or more networks may be, for example, a 4G communication network and a 5G communication network.

The wireless communication unit 110 may include at least one of a 4G wireless communication module 111, a 5G wireless communication module 112, a short-range communication module 113, and a location information module 114.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station.

In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) structure. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE re-farming. In some examples, a Sub 6 frequency band, which is a range of 6 GHz or less, may be used as the 5G frequency band.

On the other hand, a millimeter-wave (mmWave) range may be used as the 5G frequency band to perform wideband high-speed communication. When the mmWave band is used, the electronic device 100 may perform beamforming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication unit 110 may be in a Dual Connectivity (DC) state with the 4G base station and the 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, if the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112.

The short-range communication module 113 is configured to facilitate short-range communications. Suitable technologies for implementing such short-range communications include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area network. One example of the wireless area networks is a wireless personal area network.

Short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission rate improvement and communication system convergence, Carrier Aggregation (CA)

may be carried out using at least one of the 4G wireless communication module 111 and the 5G wireless communication module 112 and a WiFi communication module. In this regard, 4G+WiFi CA may be performed using the 4G wireless communication module 111 and the Wi-Fi communication module 113. Or, 5G+WiFi CA may be performed using the 5G wireless communication module 112 and the Wi-Fi communication module 113.

The location information module 114 may be generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless Access Point (AP) which transmits or receives a wireless signal to or from the Wi-Fi module. If desired, the location information module 114 may alternatively or additionally function with any of the other modules of the wireless communication unit 110 to obtain data related to the position of the electronic device. The location information module 114 is a module used for acquiring the position (or the current position) and may not be limited to a module for directly calculating or acquiring the position of the electronic device.

Specifically, when the electronic device utilizes the 5G wireless communication module 112, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensor unit 140 may typically be implemented using one or more sensors configured to sense internal information of the electronic device, the surrounding environment of the electronic device, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output unit 150 may typically be configured to output various types of information, such as audio, video, tactile output, and the like. The output unit 150 may be shown having at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user.

The interface unit 160 serves as an interface with various types of external devices that are coupled to the electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. Some of these application programs may be downloaded from an external server via wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

The controller 180 typically functions to control an overall operation of the electronic device 100, in addition to the operations associated with the application programs. The control unit 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control a combination of at least two of those components included in the electronic device 100 to activate the application program.

The power supply unit 190 may be configured to receive external power or provide internal power in order to supply appropriate power required for operating elements and components included in the electronic device 100. The power supply unit 190 may include a battery, and the battery may be configured to be embedded in the terminal body, or configured to be detachable from the terminal body.

At least part of the components may cooperably operate to implement an operation, a control or a control method of an electronic device according to various implementations disclosed herein. Also, the operation, the control or the control method of the electronic device may be implemented on the electronic device by an activation of at least one application program stored in the memory 170.

Figure 2B:
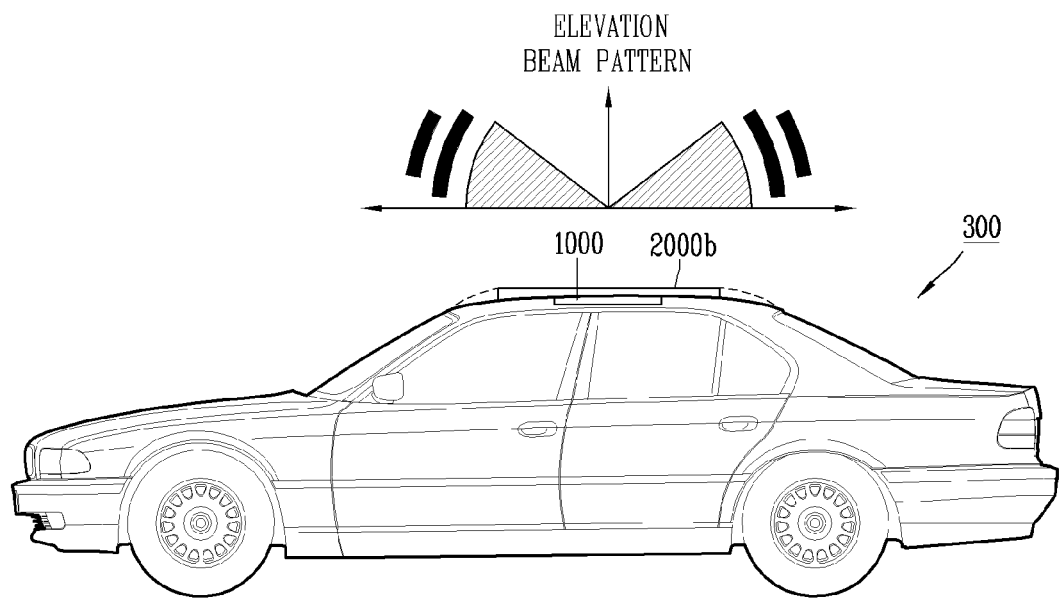
Figure 2C:
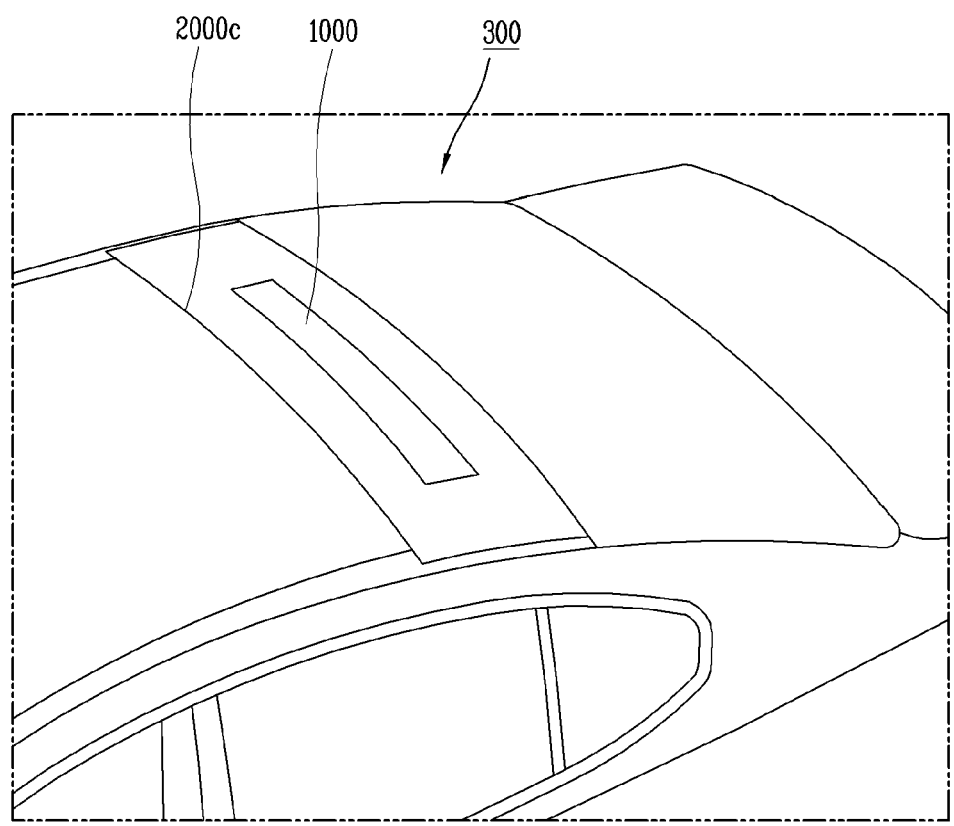

FIGS. 2A to 2C are views illustrating an example of a structure for mounting an antenna system on a vehicle, which includes the antenna system mounted on the vehicle.

In this regard, FIGS. 2A and 2B illustrate a configuration in which an antenna system 1000 is mounted on or in a roof of a vehicle. Meanwhile, FIG. 2C illustrates a structure in which the antenna system 1000 is mounted on a roof of the vehicle and a roof frame of a rear mirror.

Referring to FIGS. 2A to 2C, in order to improve the appearance of the vehicle and to maintain a telematics performance at the time of collision, an existing shark fin antenna is replaced with a flat antenna of a non-protruding shape. In addition, the present disclosure proposes an integrated antenna of an LTE antenna and a 5G antenna considering fifth generation (5G) communication while providing the existing mobile communication service (e.g., LTE).

Referring to FIG. 2A, the antenna system 1000 may be disposed on the roof of the vehicle. In FIG. 2A, a radome 2000a for protecting the antenna system 1000 from an external environment and external impacts while the vehicle travels may cover the antenna system 1000. The radome 2000a may be made of a dielectric material through which radio signals are transmitted/received between the antenna system 1000 and a base station.

Referring to 2B, the antenna system 1000 may be disposed within a roof structure 2000b of the vehicle, and at least part of the roof structure 2000b may be made of a non-metallic material. At this time, the at least part of the roof structure 2000b of the vehicle may be realized as the non-metallic material, and may be made of a dielectric material through which radio signals are transmitted/received between the antenna system 1000 and the base station.

Also, referring to 2C, the antenna system 1000 may be disposed within a roof frame 2000c of the vehicle, and at least part of the roof frame 200c may be made of a non-metallic material. At this time, the at least part of the roof frame 2000c of the vehicle may be realized as the non-metallic material, and may be made of a dielectric material through which radio signals are transmitted/received between the antenna system 1000 and the base station.

Figure 3:
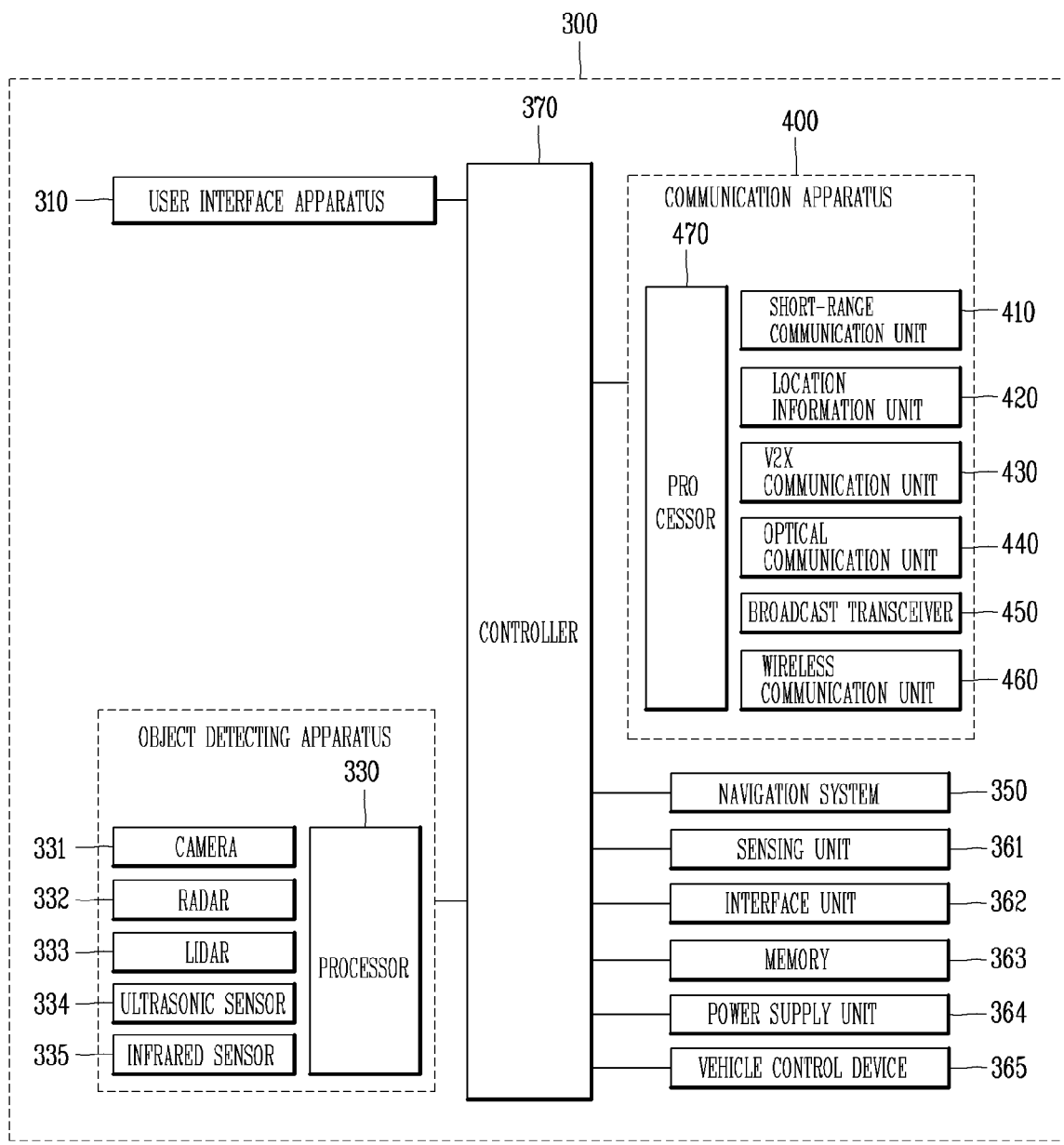
FIG. 3 is a block diagram illustrating a vehicle in accordance with an implementation.

Meanwhile, the antenna system 1000 may be installed on a front or rear surface of the vehicle depending on applications, other than the roof structure or roof frame of the vehicle. FIG. 3 is a block diagram illustrating a vehicle in accordance with an implementation of the present disclosure.

As illustrated in FIG. 2A to 3, a vehicle 300 may include wheels turning by a driving force, and a steering apparatus 510 for adjusting a driving (ongoing, moving) direction of the vehicle 300.

The vehicle 300 may be an autonomous vehicle. The vehicle 300 may be switched into an autonomous (driving) mode or a manual (driving) mode based on a user input. For example, the vehicle 300 may be switched from the manual mode into the autonomous mode or from the autonomous mode into the manual mode based on a user input received through a user interface apparatus 310.

The vehicle 300 may be switched into the autonomous mode or the manual mode based on driving environment information. The driving environment information may be generated based on object information provided from an object detecting apparatus 320. For example, the vehicle 300 may be switched from the manual mode into the autonomous mode or from the autonomous mode into the manual mode based on driving environment information generated in the object detecting apparatus 320.

In an example, the vehicle 300 may be switched from the manual mode into the autonomous mode or from the autonomous mode into the manual mode based on driving environment information received through a communication apparatus 400. The vehicle 300 may be switched from the manual mode into the autonomous mode or from the autonomous mode into the manual mode based on information, data or signal provided from an external device.

When the vehicle 300 is driven in the autonomous mode, the autonomous vehicle 300 may be driven based on an operation system. For example, the autonomous vehicle 300 may be driven based on information, data or signal generated in a driving system, a parking exit system, and a parking system.

When the vehicle 300 is driven in the manual mode, the autonomous vehicle 300 may receive a user input for driving through a driving control apparatus. The vehicle 300 may be driven based on the user input received through the driving control apparatus.

An overall length refers to a length from a front end to a rear end of the vehicle 300, a width refers to a width of the vehicle 300, and a height refers to a length from a bottom of a wheel to a roof. In the following description, an overall-length direction L may refer to a direction which is a criterion for measuring the overall length of the vehicle 300, a width direction W may refer to a direction that is a criterion for measuring a width of the vehicle 300, and a height direction H may refer to a direction that is a criterion for measuring a height of the vehicle 300.

As illustrated in FIG. 3, the vehicle 300 may include a user interface apparatus 310, an object detecting apparatus 320, a navigation system 350, and a communication device 400. In addition, the vehicle may further include a sensing unit 361, an interface unit 362, a memory 363, a power supply unit 364, and a vehicle control device 365 in addition to the aforementioned apparatuses and devices. Here, the sensing unit 361, the interface unit 362, the memory 363, the power supply unit 364, and the vehicle control device 365 may have low direct relevance to wireless communication through the antenna system 1000 according to the present disclosure. So, a detailed description thereof will be omitted herein.

According to implementations, the vehicle 300 may include more components in addition to components to be explained in this specification or may not include some of those components to be explained in this specification.

The user interface apparatus 310 may be an apparatus for communication between the vehicle 300 and a user. The user interface apparatus 310 may receive a user input and provide information generated in the vehicle 300 to the user. The vehicle 310 may implement user interfaces (UIs) or user experiences (UXs) through the user interface apparatus 200.

The object detecting apparatus 320 may be an apparatus for detecting an object located at outside of the vehicle 300. The object may be a variety of objects associated with driving (operation) of the vehicle 300. In some examples, objects may be classified into moving objects and fixed (stationary) objects. For example, the moving objects may include other vehicles and pedestrians. The fixed objects may include traffic signals, roads, and structures, for example.

The object detecting apparatus 320 may include a camera 321, a radar 322, a LiDAR 323, an ultrasonic sensor 324, an infrared sensor 325, and a processor 330.

According to an implementation, the object detecting apparatus 320 may further include other components in addition to the components described, or may not include some of the components described.

The processor 330 may control an overall operation of each unit of the object detecting apparatus 320. The processor 330 may detect an object based on an acquired image, and track the object. The processor 330 may execute operations, such as a calculation of a distance from the object, a calculation of a relative speed with the object and the like, through an image processing algorithm.

The processor 330 may detect an object based on a reflected electromagnetic wave which an emitted electromagnetic wave is reflected from the object, and track the object. The processor 330 may execute operations, such as a calculation of a distance from the object, a calculation of a relative speed with the object and the like, based on the electromagnetic wave.

The processor 330 may detect an object based on a reflected laser beam which an emitted laser beam is reflected from the object, and track the object. The processor 330 may execute operations, such as a calculation of a distance from the object, a calculation of a relative speed with the object and the like, based on the laser beam.

The processor 330 may detect an object based on a reflected ultrasonic wave which an emitted ultrasonic wave is reflected from the object, and track the object. The processor 330 may execute operations, such as a calculation of a distance from the object, a calculation of a relative speed with the object and the like, based on the ultrasonic wave.

The processor 330 may detect an object based on reflected infrared light which emitted infrared light is reflected from the object, and track the object. The processor 330 may execute operations, such as a calculation of a distance from the object, a calculation of a relative speed with the object and the like, based on the infrared light.

According to an implementation, the object detecting apparatus 320 may include a plurality of processors 330 or may not include any processor 330. For example, each of the camera 321, the radar 322, the LiDAR 323, the ultrasonic sensor 324 and the infrared sensor 325 may include the processor in an individual manner.

When the processor 330 is not included in the object detecting apparatus 320, the object detecting apparatus 320 may operate according to the control of a processor of an apparatus within the vehicle 300 or the controller 370.

The navigation system 350 may provide location information related to the vehicle based on information obtained through the communication apparatus 400, in particular, a location information unit 420. Also, the navigation system 350 may provide a path (or route) guidance service to a destination based on current location information related to the vehicle. In addition, the navigation system 350 may provide guidance information related to surroundings of the vehicle based on information obtained through the object detecting apparatus 320 and/or a V2X communication unit 430. In some examples, guidance information, autonomous driving service, etc. may be provided based on V2V, V2I, and V2X information obtained through a wireless communication unit operating together with the antenna system 1000.

The object detecting apparatus 320 may operate according to the control of a controller 370.

The communication apparatus 400 may be an apparatus for performing communication with an external device. Here, the external device may be another vehicle, a mobile terminal, or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a 4G wireless communication module 450, and a processor 470.

According to an implementation, the communication apparatus 400 may further include other components in addition to the components described, or may not include some of the components described.

The short-range communication unit 410 is a unit for facilitating short-range communications. Suitable technologies for implementing such short-range communications may include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range wireless area networks to perform short-range communication between the vehicle 300 and at least one external device.

The location information unit 420 may be a unit for acquiring location information related to the vehicle 300. For example, the location information unit 420 may include a Global Positioning System (GPS) module or a Differential Global Positioning System (DGPS) module.

The V2X communication unit 430 may be a unit for performing wireless communication with a server (Vehicle to Infrastructure; V2I), another vehicle (Vehicle to Vehicle; V2V), or a pedestrian (Vehicle to Pedestrian; V2P). The V2X communication unit 430 may include an RF circuit implementing communication protocols such as V2I, V2V, and V2P.

The optical communication unit 440 may be a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an implementation, the light-emitting diode may be integrated with lamps provided on the vehicle 300.

The broadcast transceiver 450 may be a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal, and a data broadcast signal.

The wireless communication unit 460 is a unit that performs wireless communications with one or more communication systems through one or more antenna systems. The wireless communication unit 460 may transmit and/or receive a signal to and/or from a device in a first communication system through a first antenna system. In addition, the wireless communication unit 460 may transmit and/or receive a signal to and/or from a device in a second communication system through a second antenna system. For example, the first communication system and the second communication system may be an LTE communication system and a 5G communication system, respectively. However, the first communication system and the second communication system may not be limited thereto, and may be changed according to applications.

According to the present disclosure, the antenna system 1000 operating in the first and second communication systems may be disposed on the roof, in the roof or in the roof frame of the vehicle 300 according to one of FIGS. 2A to 2C. Meanwhile, the wireless communication unit 460 of FIG. 3 may operate in both the first and second communication systems, and may be combined with the antenna system 1000 to provide multiple communication services to the vehicle 300.

The processor 470 may control an overall operation of each unit of the communication apparatus 400.

According to an implementation, the communication apparatus 400 may include a plurality of processors 470 or may not include any processor 470.

When the processor 470 is not included in the communication apparatus 400, the communication apparatus 400 may operate according to the control of a processor of another device within the vehicle 300 or the controller 370.

Meanwhile, the communication apparatus 400 may implement a display apparatus for a vehicle together with the user interface apparatus 310. In this instance, the display apparatus for the vehicle may be referred to as a telematics apparatus or an Audio Video Navigation (AVN) apparatus.

The communication apparatus 400 may operate according to the control of the controller 370.

At least one processor and the controller 370 included in the vehicle 300 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

The vehicle 300 related to the present disclosure can operate in any one of a manual driving mode and an autonomous driving mode. That is, the driving modes of the vehicle 300 may include the manual driving mode and the autonomous driving mode.

Hereinafter, description will be given of implementations of a multi-transceiving system structure and an electronic device or vehicle having the same with reference to the accompanying drawings. Specifically, implementations related to a broadband antenna operating in a heterogeneous radio system, and an electronic device and a vehicle having the same will be described. It will be apparent to those skilled in the art that the present disclosure may be embodied in other specific forms without departing from the idea or essential characteristics thereof.

Figure 4:
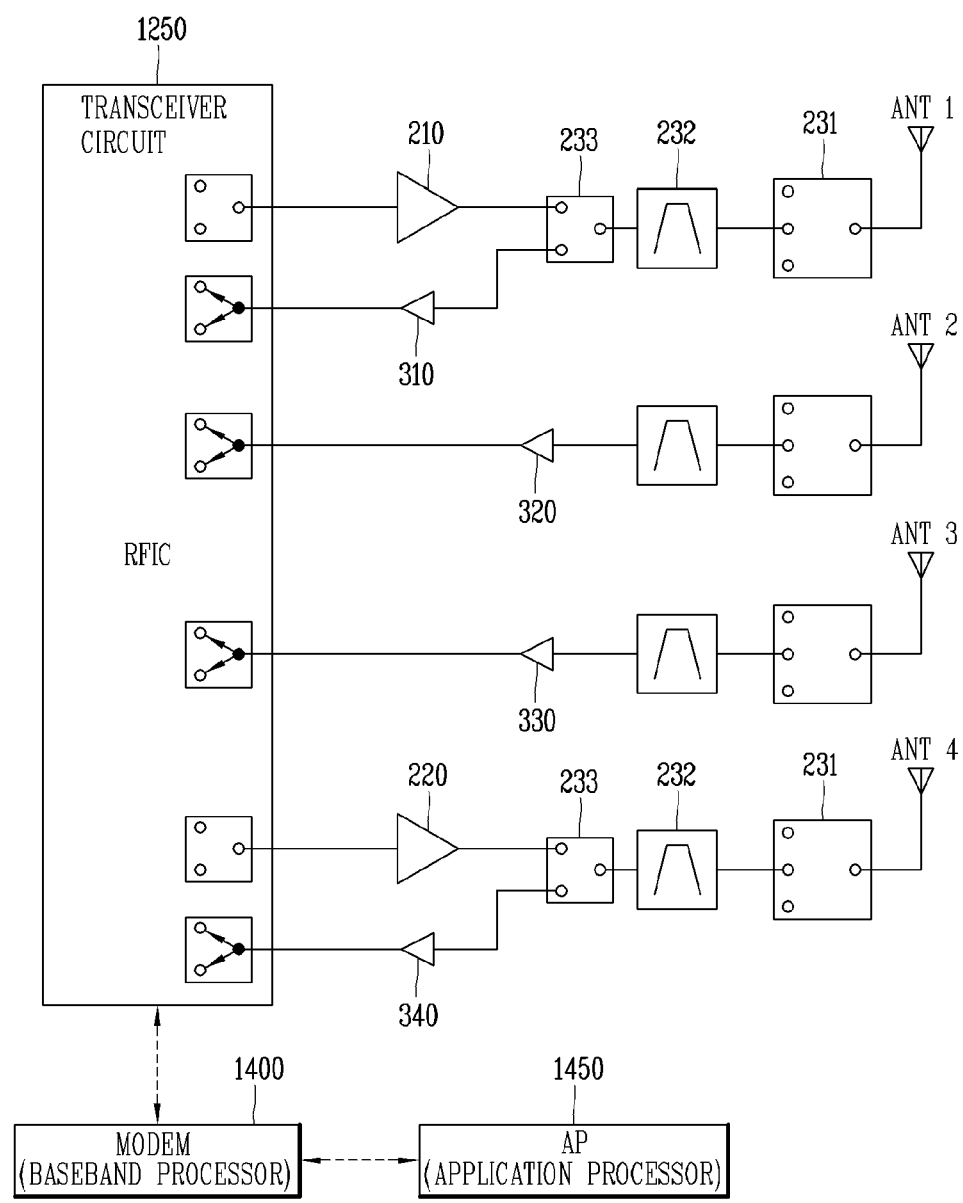
FIG. 4 is a block diagram illustrating a configuration of a wireless communication unit of an electronic device or vehicle operable in a plurality of wireless communication systems according to the present disclosure.

FIG. 4 is a block diagram illustrating a configuration of a wireless communication unit of an electronic device or vehicle operable in a plurality of wireless communication systems according to the present disclosure. Referring to FIG. 4, the electronic device or the vehicle may include a first power amplifier 210, a second power amplifier 220, and an RFIC 1250. In addition, the electronic device or the vehicle may further include a modem 1400 and an application processor (AP) 1450. Here, the modem 1400 and the application processor (AP) 1450 may be physically implemented on a single chip, and may be implemented in a logically and functionally separated form. However, the present disclosure may not be limited thereto and may be implemented in the form of a chip that is physic ally separated according to an application.

Meanwhile, the electronic device or the vehicle may include a plurality of low noise amplifiers (LNAs) 210a to 240a in the receiver. Here, the first power amplifier 210, the second power amplifier 220, the RFIC 1250, and the plurality of low noise amplifiers 210a to 240a may all be operable in the first communication system and the second communication system. In this case, the first communication system and the second communication system may be a 4G communication system and a 5G communication system, respectively.

As illustrated in FIG. 4, the RFIC 1250 may be configured as a 4G/5G integrated type, but the present disclosure may not be limited thereto. The RFIC 250 may be configured as a 4G/5G separate type according to an application. When the RFIC 1250 is configured as the 4G/5G integrated type, it may be advantageous in terms of synchronization between 4G and 5G circuits, and simplification of control signaling by the modem 1400.

On the other hand, when the RFIC 1250 is configured as the 4G/5G separate type, it may be referred to as a 4G RFIC and a 5G RFIC, respectively. In particular, when there is a great band difference between the 5G band and the 4G band, such as when the 5G band is configured as a millimeter wave band, the RFIC 1250 may be configured as a 4G/5G separated type. As such, when the RFIC 1250 is configured as the 4G/5G separate type, there may be an advantage that the RF characteristics can be optimized for each of the 4G band and the 5G band.

Meanwhile, even when the RFIC 1250 is configured as the 4G/5G separate type, the 4G RFIC and the 5G RFIC may be logically and functionally separated but physically implemented in one chip.

On the other hand, the application processor (AP) 1450 may be configured to control the operation of each component of the electronic device. Specifically, the application processor (AP) 1450 may control the operation of each component of the electronic device through the modem 1400.

For example, the modem 1400 may be controlled through a power management IC (PMIC) for low power operation of the electronic device. Accordingly, the modem 1400 may operate power circuits of a transmitter and a receiver through the RFIC 1250 in a low power mode.

In this regard, when it is determined that the electronic device is in an idle mode, the application processor (AP) 1450 may control the RFIC 1250 through the modem 1400 as follows. For example, when the electronic device is in an idle mode, the application processor 1450 may control the RFIC 1250 through the modem 1400, such that at least one of the first and second power amplifiers 210 and 220 operates in a low power mode or is turned off.

According to another implementation, the application processor (AP) 1450 may control the modem 1400 to enable wireless communication capable of performing low power communication when the electronic device is in a low battery mode. For example, when the electronic device is connected to a plurality of entities among a 4G base station, a 5G base station, and an access point, the application processor (AP) 1450 may control the modem 1400 to enable wireless communication at the lowest power. Accordingly, even though a throughput is slightly sacrificed, the application processor (AP) 1450 may control the modem 1400 and the RFIC 1250 to perform short-range communication using only the short-range communication module 113.

According to another implementation, when a remaining battery capacity of the electronic device is equal to or greater than a threshold value, the application processor 1450 may control the modem 1400 to select an optimal wireless interface. For example, the application processor (AP) 1450 may control the modem 1400 to receive data through both the 4G base station and the 5G base station according to the remaining battery capacity and the available radio resource information. In this case, the application processor (AP) 1450 may receive the remaining battery capacity information from the PMIC and the available radio resource information from the modem 1400. Accordingly, when the remaining battery capacity and the available radio resources are sufficient, the application processor (AP) 1450 may control the modem 1400 and the RFIC 1250 to receive data through both the 4G base station and 5G base station.

Meanwhile, in a multi-transceiving system of FIG. 4, a transmitter and a receiver of each radio system may be integrated into a single transceiver. Accordingly, a circuit portion for integrating two types of system signals may be removed from an RF front-end.

In addition, since the front-end component can be controlled by the integrated transceiver, the front-end component can be more efficiently integrated than that in a case where the transceiving system is separated for each communication system.

In addition, when separated for each communication system, different communication systems cannot be controlled as needed, or because this may lead to a system delay, resources cannot be efficiently allocated. On the other hand, in the multi-transceiving system as illustrated in FIG. 2, different communication systems can be controlled as needed, system delay can be minimized, and resources can be efficiently allocated.

Meanwhile, the first power amplifier 210 and the second power amplifier 220 may operate in at least one of the first and second communication systems. In this regard, when the 5G communication system operates in a 4G band or a Sub 6 band, the first and second power amplifiers 1210 and 220 can operate in both the first and second communication systems.

On the other hand, when the 5G communication system operates in a millimeter wave (mmWave) band, one of the first and second power amplifiers 210 and 220 may operate in the 4G band and the other in the millimeter-wave band.

On the other hand, two different wireless communication systems may be implemented in one antenna by integrating a transceiver and a receiver to implement a two-way antenna. In this case, 4×4 MIMO may be implemented using four antennas as illustrated in FIG. 2. At this time, 4×4 DL MIMO may be performed through downlink (DL).

Meanwhile, when the 5G band is a Sub 6 band, first to fourth antennas ANT1 to ANT4 may be configured to operate in both the 4G band and the 5G band. On the contrary, when the 5G band is the millimeter wave (mm-Wave) band, first to fourth antennas ANT1 to ANT4 may be configured to operate in either one of the 4G band and the 5G band. In this case, when the 5G band is the millimeter wave (mmWave) band, each of the plurality of antennas may be configured as an array antenna in the millimeter wave band.

Meanwhile, 2×2 MIMO may be implemented using two antennas connected to the first power amplifier 210 and the second power amplifier 220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented by 1 Tx, only one of the first and second power amplifiers 210 and 220 need to operate in the 5G band. Meanwhile, when the 5G communication system is implemented by 4 Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is embedded in RFIC corresponding to the RFIC 1250. Accordingly, a separate component does not need to be placed outside, thereby improving component mounting performance. In detail, a transmitter (TX) of two different communication systems can be selected by using a single pole double throw (SPDT) type switch provided in the RFIC corresponding to the controller.

In addition, the electronic device or the vehicle capable of operating in a plurality of wireless communication systems according to an implementation may further include a duplexer 231, a filter 232, and a switch 233.

The duplexer 231 may be configured to separate a signal in a transmission band and a signal in a reception band from each other. In this case, the signal in the transmission band transmitted through the first and second power amplifiers 210 and 220 may be applied to the antennas ANT1 and ANT4 through a first output port of the duplexer 231. On the contrary, the signal in the reception band received through the antennas ANT1 and ANT4 may be received by the low noise amplifiers 210*a* and 240*a* through a second output port of the duplexer 231.

The filter 232 may be configured to pass a signal in a transmission band or a reception band and to block a signal in a remaining band. In this case, the filter 232 may include a transmission filter connected to the first output port of the duplexer 231 and a reception filter connected to the second output port of the duplexer 231. Alternatively, the filter 232 may be configured to pass only the signal in the transmission band or only the signal in the reception band according to a control signal.

The switch 233 may be configured to transmit only one of a transmission signal and a reception signal. In an implementation of the present disclosure, the switch 233 may be configured in a single-pole double-throw (SPDT) form to separate the transmission signal and the reception signal in a time division duplex (TDD) scheme. In this case, the transmission signal and the reception signal may be in the same frequency band, and thus the duplexer 231 may be implemented in a form of a circulator.

Meanwhile, in another implementation of the present disclosure, the switch 233 may also be applied to a frequency division multiplex (FDD) scheme. In this case, the switch 233 may be configured in a form of a double-pole double-throw (DPDT) to connect or block the transmission signal and the reception signal, respectively. On the other hand, since the transmission signal and the reception signal can be separated by the duplexer 231, the switch 233 may not be necessarily required.

Meanwhile, the electronic device or the vehicle according to the present disclosure may further include a modem 1400 corresponding to the controller. In this case, the RFIC 1250 and the modem 1400 may be referred to as a first controller (or a first processor) and a second controller (a second processor), respectively. On the other hand, the RFIC 1250 and the modem 1400 may be implemented as physically separated circuits. Alternatively, the RFIC 1250 and the modem 1400 may be logically or functionally distinguished from each other on one physical circuit.

The modem 1400 may perform controlling of signal transmission and reception and processing of signals through different communication systems using the RFID 1250. The modem 1400 may acquire control information from a 4G base station and/or a 5G base station. Here, the control information may be received through a physical downlink control channel (PDCCH), but may not be limited thereto.

The modem 1400 may control the RFIC 1250 to transmit and/or receive signals through the first communication system and/or the second communication system for a specific time interval and from frequency resources. Accordingly, the RFIC 1250 may control transmission circuits including the first and second power amplifiers 210 and 220 to transmit a 4G signal or a 5G signal in the specific time interval. In addition, the RFIC 1250 may control reception circuits including the first to fourth low noise amplifiers 210a to 240a to receive a 4G signal or a 5G signal in the specific time interval.

Hereinafter, the antenna system that is mounted on the vehicle and includes the plurality of antennas and the vehicle having the antenna system according to FIGS. 2 to 4 will be described.

It is necessary to improve antenna performance while maintaining a low-profile structure in the antenna system. However, in the three-dimensional antenna system, a mechanical structure for fixing the antenna in a vehicle is required while securing a height of an antenna itself. This may cause a problem that the antenna performance should be improved while maintaining the mechanical structure to be equal to or lower than a predetermined height.

In addition, when such an antenna system is disposed in a vehicle, it is necessary to provide a plurality of antennas in different bands. In this case, when the antennas operating in the different bands are implemented on the same plane, an increase in an antenna arrangement space may be caused. This may bring about an insufficient space for mounting the antenna system including the plurality of antennas in the vehicle.

The present disclosure is thus directed to solving the aforementioned problems and other drawbacks. The present disclosure also describes performance improvement of an antenna system while maintaining a height of the antenna system mounted in a vehicle to be lower than or equal to a predetermined level.

The present disclosure further describes a structure for mounting an antenna system, which is capable of operating in a broad frequency band to support various communication systems, to a vehicle.

The present disclosure further describes a method for implementing an additional antenna by utilizing an existing space without extending a separate antenna space.

The present disclosure further describes an antenna configuration capable of operating as a broadband antenna in a low band (LB).

On the other hand, requirements for a vehicle antenna system according to the present disclosure may be as follows.

Vehicle antenna requirements: Average gain (Mean gain) is −2 dBi at a low elevation, i.e., 70 to 90 degrees of elevation. That is, the mean gain corresponding to horizontal radiation performance in an almost horizontal direction that corresponds to the low elevation is −2 dB.

Limitations of the related art: With an antenna technology using an inner space of a module, it is difficult to satisfy antenna performance requirements due to performance degradation caused by a low antenna height.

Necessity of the present disclosure: An antenna structure is required to improve antenna performance without an additional increase in height to secure antenna performance.

This may bring up the low band (LB) antenna issue as follows. In an on-ground environment of the vehicle and a design space with an antenna height of 17 mm or less, a beam peak is formed vertically, so it is difficult to satisfy low elevation performance. In this regard, a shark antenna having a low elevation characteristic at 1 GHz or less may be located in an outer region of the vehicle. On the other hand, a vehicle antenna to be implemented in the present disclosure needs to be implemented to have a height that is equal to or lower than a predetermined height.

In addition, the vehicle antenna needs to be equipped with a plurality of antennas in addition to the low-band (LB) antenna issue. The plurality of antennas may include an antenna operating in a middle band (MB) and a high band (HB). The plurality of antennas may also include at least one antenna operating in different WiFi bands.

In this regard, a junction portion may be generated between a PCB and a FPCB in view of a module structure for a vehicle. Therefore, the present disclosure intends to propose a method of designing a WIFI antenna using a slot generated in a junction portion.

In this regard, an open slot of about 18 mm to 25 mm may be formed in the junction portion between the PCB and the FPCB, and the WIFI antenna can be implemented using the slot. Since WIFI connection should be enabled through inside and outside of the vehicle, there may be a limitation in implementing an antenna in the FPCB region. Accordingly, a region in which an antenna can be implemented is separated into both sides, one antenna may require a very long transmission line from a WIFI chip.

Therefore, in the present disclosure, a feeding structure from the WIFI chip can be implemented very efficiently by using two slot antennas disposed in opposite directions.

Figure 5:
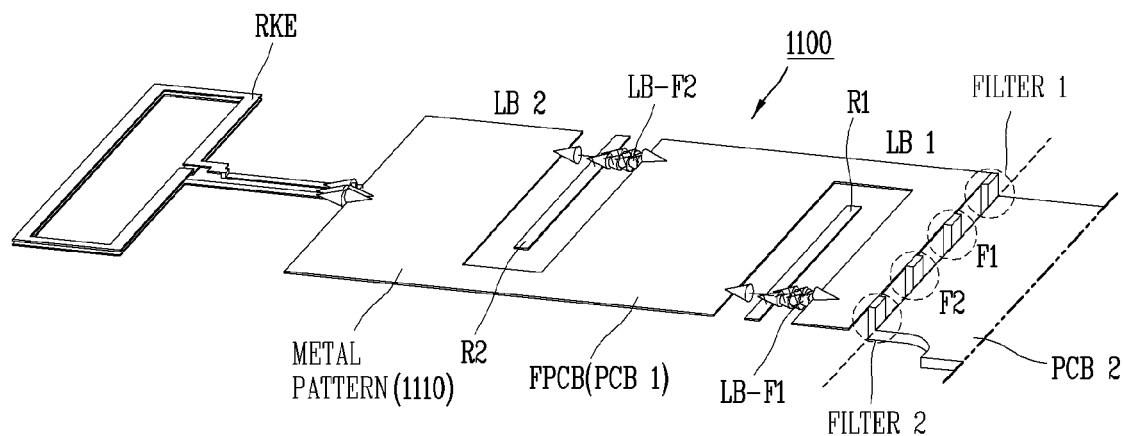
FIG. 5 is a diagram illustrating a configuration of a plurality of antennas constituting an antenna system mounted on a vehicle in accordance with one implementation.
Figure 6:
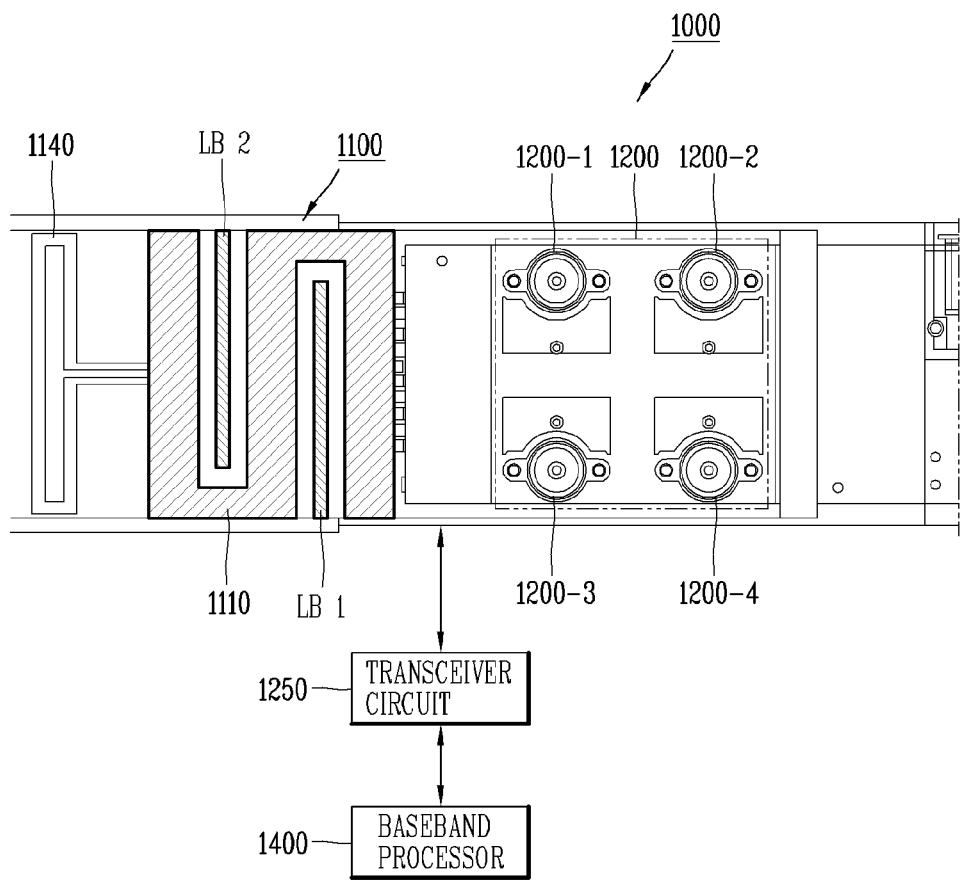
FIG. 6 is a diagram illustrating a plurality of antennas constituting an antenna system mounted on a vehicle and a configuration of controlling the same in accordance with one implementation.
Figure 7:
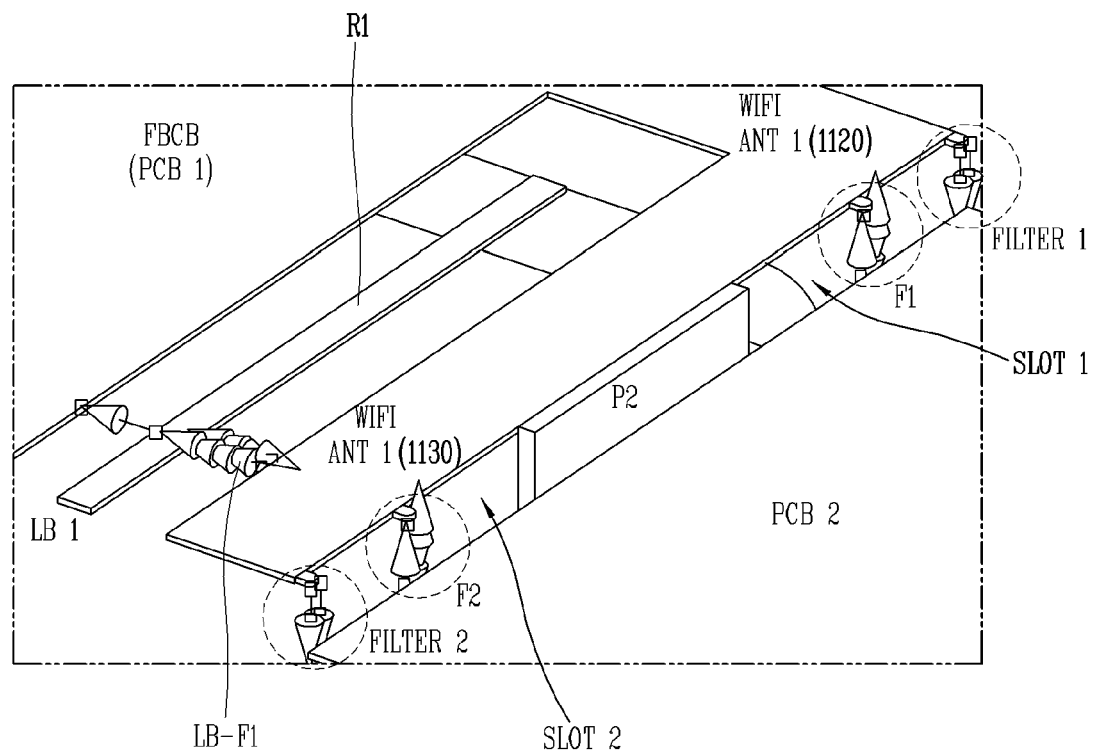
FIG. 7 is an enlarged view illustrating a detailed configuration of an LB antenna and a slot antenna in accordance with one implementation.

FIG. 5 is a diagram illustrating a configuration of a plurality of antennas constituting an antenna system mounted on a vehicle in accordance with one implementation. Also, FIG. 6 illustrates a plurality of antennas constituting an antenna system mounted on a vehicle and a configuration for controlling them according to an exemplary implementation. FIG. 7 is an enlarged view illustrating a detailed configuration of an LB antenna and a slot antenna in accordance with one implementation.

Referring to FIGS. 5 to 7, an antenna system 1000 mounted on a vehicle according to one implementation may include a first printed circuit board (PCB) PCB1, a second PCB PCB2, and a slot antenna SLOT1, SLOT2.

The first PCB PCB1 may include a metal pattern 1110 and a dielectric region. A plurality of antennas may be disposed on the second PCB PCB2. In this case, low-band (LB) antennas LB1 and LB2 capable of operating in the low band LB may be disposed on the first PCB PCB1. On the other hand, antennas 1200 capable of operating in the middle band MB and the high band HB may be disposed on the second PCB PCB2.

Here, the low band LB may be considered to include 650 MHz to 900 MHz or 600 MHz to 960 MHz. However, the low band LB may not be limited thereto and may vary depending on applications. Also, the middle band LB may be considered as a frequency band starting from 1400 MHz, but may not be limited thereto and may vary depending on applications. The high band HB may be higher than the middle band MB and considered as a frequency band starting from 2500 MHz or 3500 MHz, but may not be limited thereto and may vary depending on applications.

The slot antenna SLOT1, SLOT2 may be configured to radiate a signal through a slot region which is generated adjacent to a junction portion between the first PCB PCB1 and the second PCB PCB2. The slot region of the slot antenna SLOT1, SLOT2 may be defined to be perpendicular to the first PCB PCB1 and the second PCB PCB2. The slot antenna may include a plurality of slot antennas SLOT1 and SLOT2 separated from each other by a second metal pattern P2, by which a metal pattern of the first PCB PCB1 and a metal pattern of the second PCB PCB2 are connected vertically.

In one example, the plurality of slot antennas may include a first slot antenna SLOT1, 1120 and a second slot antenna SLOT2, 1130. The first slot antenna SLOT1 may be formed in a first slot region located at one side of the second metal pattern P2. On the other hand, the second slot antenna SLOT2 may be formed in a second slot region located on another side of the second metal pattern P2.

Figure 8A:
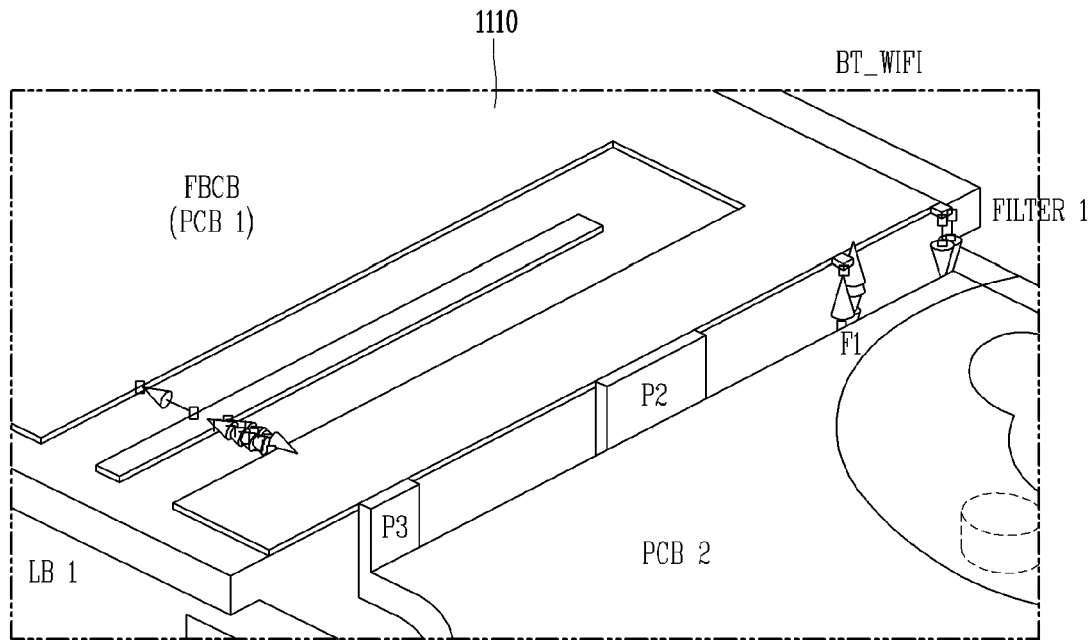
FIG. 8A is an enlarged view illustrating a detailed configuration of an LB antenna and a slot antenna in accordance with another implementation.
Figure 8B:
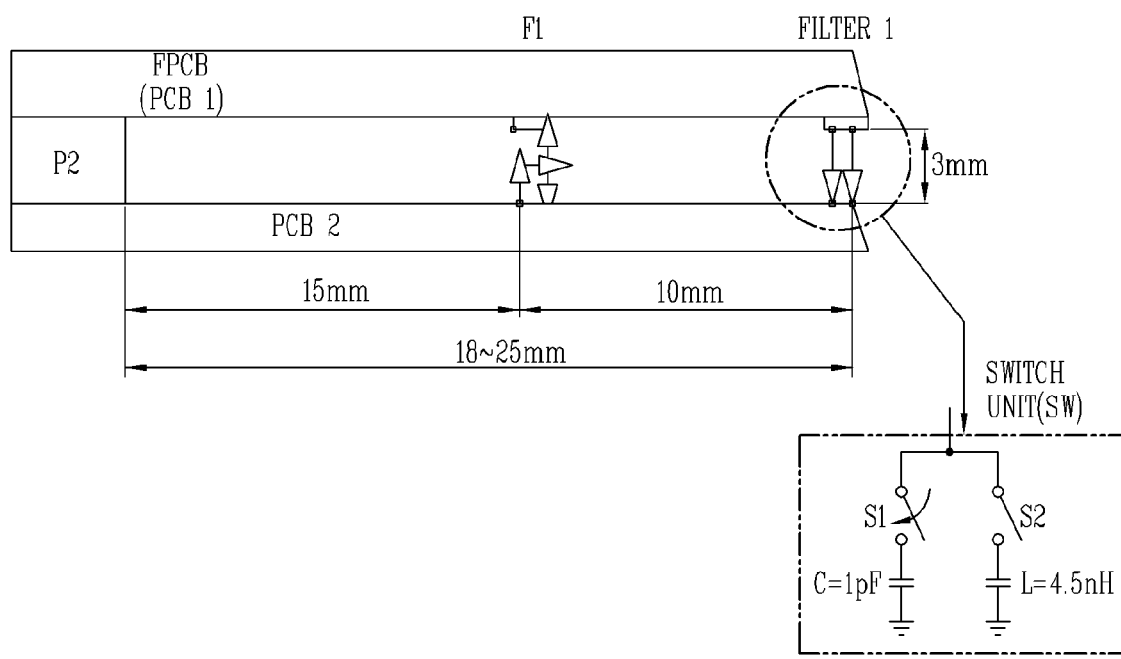
FIG. 8B is a conceptual diagram in which a switch unit is further provided in a filter part in the configuration of FIG. 8A.

In one implementation, each of the plurality of slot antennas SLOT1 and SLOT2 may include a filter part and a feeder. As aforementioned, FIG. 7 is an enlarged view illustrating a detailed configuration of an LB antenna and a slot antenna in accordance with one implementation. And, FIG. 8A is an enlarged view illustrating a detailed configuration of an LB antenna and a slot antenna in accordance with another implementation. FIG. 8B is a conceptual diagram in which a switch unit is further provided in a filter part in the configuration of FIG. 8A.

Referring to FIGS. 5 to 8B, the first slot antenna SLOT1, 1120 may include a first filter part FILTER1 and a first feeder F1. The first filter part FILTER1 may be configured to connect one end portion of the metal pattern of the first PCB PCB1 and one end portion of the metal pattern of the second PCB PCB2. The first feeder F1 may be configured to feed the first slot region at one point between the first filter part FILTER1 and the second metal pattern P2.

Similar to this, the second slot antenna SLOT2, 1130 may include a second filter part FILTER2 and a second feeder F2. The second filter part FILTER2 may be configured to connect another end portion of the metal pattern of the first PCB PCB1 and another end portion of the metal pattern of the second PCB PCB2. The second feeder F2 may be configured to feed the second slot region at one point between the second filter part FILTER2 and the second metal pattern P2.

Therefore, in the present disclosure, an open slot (Fixed region) of about 18 mm to 25 mm may be formed through the junction portion between the PCB and the FPCB, and a filter may be inserted into an end portion of the open slot to be used as a tuning factor. This can allow the slot antenna SLOT1, SLOT2 to be used even in a region (i.e., a folding or sliding region) where the junction portion changes, as long as mechanical implementation is ensured.

Meanwhile, referring to FIG. 8A, a WiFi antenna can be implemented with only the first slot antenna SLOT1, 1120. Here, since the second slot antenna SLOT2, 1130 of FIG. 7 is adjacent to the first LB antenna LB1, mutual interference may occur. Accordingly, the WiFi antenna can be implemented only with the first slot antenna SLOT1, 1120. In this case, the first filter part FILTER1 and the first feeder F1 of the first slot antenna SLOT1, 1120 may be connected to a ground layer of the first PCB PCB1. Accordingly, the first slot antenna SLOT1, 1120 may have less interference with the first LB antenna LB1 than the second slot antenna SLOT2, 1130.

As illustrated in FIG. 8A, when only the first slot antenna SLOT1, 1120 is provided, the first PCB PCB1 and the second PCB PCB2 may be connected to each other by a third metal pattern P3 in addition to the second metal pattern P2. Accordingly, when the first PCB PCB1 and the second PCB PCB2 are connected, structural stability can be improved, a wider ground region can be secured, and electrical characteristics can be stabilized.

Meanwhile, the first filter part FILTER1 may include a switch unit SW provided with an inductor L and a capacitor C. In this regard, the switch unit SW may further include switches S1 and S2 configured to connect the first PCB PCB1 and the second PCB PCB2 through the inductor and the capacitor, respectively.

The inductor L may connect one end portion of the metal pattern of the first PCB and one end portion of the metal pattern of the second PCB. Also, the capacitor C may connect one end portion of the metal pattern of the first PCB and one end portion of the metal pattern of the second PCB.

Similarly, the second filter part FILTER2 may also include a switch unit SW provided with an inductor L and a capacitor C. In this regard, the switch unit SW may further include switches S1 and S2 configured to connect the first PCB PCB1 and the second PCB PCB2 through the inductor and the capacitor, respectively.

The inductor L may connect another end portion of the metal pattern of the first PCB and another end portion of the metal pattern of the second PCB. Also, the capacitor C may connect another end portion of the metal pattern of the first PCB and another end portion of the metal pattern of the second PCB.

As aforementioned, the vehicle antenna needs to be equipped with a plurality of antennas in addition to the low-band (LB) antenna issue. The plurality of antennas may include an antenna operating in a middle band (MB) and a high band (HB). The plurality of antennas may also include at least one antenna operating in different WiFi bands.

In this regard, according to the present disclosure, the junction portion may be generated between the PCB and the FPCB, as illustrated in FIGS. 5, 7, and 8, in view of the module structure for a vehicle. Therefore, the present disclosure proposes a method of designing a WIFI antenna using a slot generated in a junction portion.

In this regard, an open slot of about 18 mm to 25 mm may be formed in the junction portion between the PCB and the FPCB, and the WIFI antenna can be implemented using the slot. Since WIFI connection should be enabled through inside and outside of the vehicle, there may be a limitation in implementing an antenna in the FPCB region. Accordingly, a region in which an antenna can be implemented is separated into both sides, one antenna may require a very long transmission line from a WIFI chip.

Therefore, in the present disclosure, a feeding structure from the WIFI chip can be implemented very efficiently by using two slot antennas disposed in opposite directions.

Meanwhile, a transceiver circuit 1250 may be provided for transmitting signals to the plurality of slot antennas SLOT1 and SLOT2. The transceiver circuit 1250 may be controlled to radiate a WiFi signal through at least one of the first slot antenna SLOT1 and the second slot antenna SLOT2. The transceiver circuit 1250 may be configured as a radio frequency integrated chip (RFIC).

Also, a baseband processor 1400 may be coupled to the transceiver circuit 1250 to operate with each other. In this regard, the baseband processor 1400 may control an operating frequency band of the slot antenna SLOT1, SLOT2 through the transceiver circuit 1250. The baseband processor 1400 may control the operating frequency band of the slot antenna SLOT1, SLOT2 by controlling the switch unit SW. Meanwhile, the baseband processor 1400 may correspond to a modem. The transceiver circuit 1250 corresponding to the RFIC and the baseband processor 1400 corresponding to the modem may be configured as a System on chip (SoC) in the form of one chip.

In one implementation, the baseband processor 1400 may control the switch unit SW so that any one of the inductor and the capacitor is connected between the metal pattern of the first PCB and the metal pattern of the second PCB. Accordingly, the baseband processor 1400 can control the slot antenna SLOT1, SLOT2 to resonate in the first frequency band or the second frequency band. That is, the baseband processor 1400 can control the slot antenna SLOT1, SLOT2 to resonate in a first WiFi band or a second WiFi band.

The first WiFi band may be 2.39 GHz to 2.48 GHz, and the second WiFi band may be 5.1 GHz to 5.8 GHz. However, the first WiFi band and the second WiFi band may not be limited thereto but vary depending on applications.

In one implementation, the first PCB PCB1 may be implemented as a flexible printed circuit board (FPCB). The FPCB may include a first LB antenna LB1 and a second LB antenna LB2 configured to operate in a first band that is a low band LB.

The transceiver circuit 1250 may radiate a signal in the first band corresponding to the low band LB through at least one of the first LB antenna LB1 and the second LB antenna LB2. The baseband processor 1400 may be coupled to the transceiver circuit 1250 to operate cooperatively. The baseband processor 1400 may control the transceiver circuit 1250 to perform MIMO through the first LB antennas LB1 and the second LB antenna LB2.

The first LB antenna LB1 may include a first radiator R1 disposed inside a first dielectric region having a predetermined width and length. The first LB antenna LB1 may further include a first feeding pattern LB-F1 that is formed from one side surface of the metal pattern 1110 surrounding the first radiator R1 to have a predetermined width and length. In this regard, the first feeding pattern LB-F1 may be implemented as a metal pattern of the FPCB, separate from the first PCB, and may be in direct contact with the first radiator R1. Alternatively, the first feeding pattern LB-F1 may be slot-coupled on a rear surface or a lower portion of the first PCB.

Similarly, the second LB antenna LB2 may include a second radiator R2 disposed inside a second dielectric region having a predetermined width and length. The second LB antenna LB2 may further include a second feeding pattern LB-F2 that is formed from one side surface of the metal pattern 1110 surrounding the second radiator R2 to have a predetermined width and length. In this regard, the second feeding pattern LB-F2 may be implemented as a metal pattern of the FPCB, separate from the first PCB, and may be in direct contact with the second radiator R2. Alternatively, the second feeding pattern LB-F2 may be slot-coupled on a rear surface or a lower portion of the first PCB.

Accordingly, the first radiator R1 and the second radiator R2 may be radiators having the predetermined widths and lengths generated from different side surfaces of the metal pattern 1110. Meanwhile, the isolation between the first LB antenna LB1 and the second LB antenna LB2 can be improved by the first radiator R1 and the second radiator R2 formed from the different side surfaces in a symmetrical shape with each other.

More specifically, an end portion of the first radiator R1 may be spaced apart from an end portion of the first dielectric region by a predetermined distance. In detail, a ground layer may be disposed at left and right sides of the first dielectric region in which the first radiator R1 is disposed. Also, the ground layer may be disposed above the first dielectric region in which the first radiator R1 is disposed.

Accordingly, a ground region corresponding to the metal pattern 1110 can be disposed adjacent to the first radiator R1, thereby reducing unnecessary radiation. Therefore, antenna efficiency of the first LB antenna LB1 including the first radiator R1 can be improved.

Similar to this, an end portion of the second radiator R2 may be spaced apart from an end portion of the second dielectric region by a predetermined distance. In detail, a ground layer may be disposed at left and right sides of the second dielectric region in which the second radiator R2 is disposed. Also, the ground layer may be disposed below the second dielectric region in which the second radiator R2 is disposed.

Accordingly, a ground region corresponding to the metal pattern 1110 can be disposed adjacent to the second radiator R2, thereby reducing unnecessary radiation. Therefore, antenna efficiency of the second LB antenna LB1 including the second radiator R2 can be improved.

Meanwhile, the antenna system 1100 mounted on the vehicle may further include a plurality of other antennas in addition to the first LB antenna LB1 and the second LB antenna LB2 and the slot antennas SLOT1 and SLOT2 which are WiFi antennas.

In this regard, a remote keyless entry (RKE) antenna 1140 may be disposed at one side of the first LB antenna LB1. In this regard, the RKE antenna 1140 may be spaced apart from the metal pattern 1110 of the first PCB. Also, one end of the RKE antenna 1140 may be connected to a feeding line and another end may be connected to the ground so as to implement a closed loop.

On the other hand, the first LB antenna LB1 and the second LB antenna LB2, the slot antenna SLOT1, SLOT2, and the RKE antenna 1140 may also be disposed on one side (e.g., left side) of the antenna system as well as another side (e.g., right side). In this regard, an SDARS antenna may be disposed in a central region between antennas disposed on the one side of the antenna system 1000 and antennas disposed on the another side of the antenna system 1000.

Figure 9:
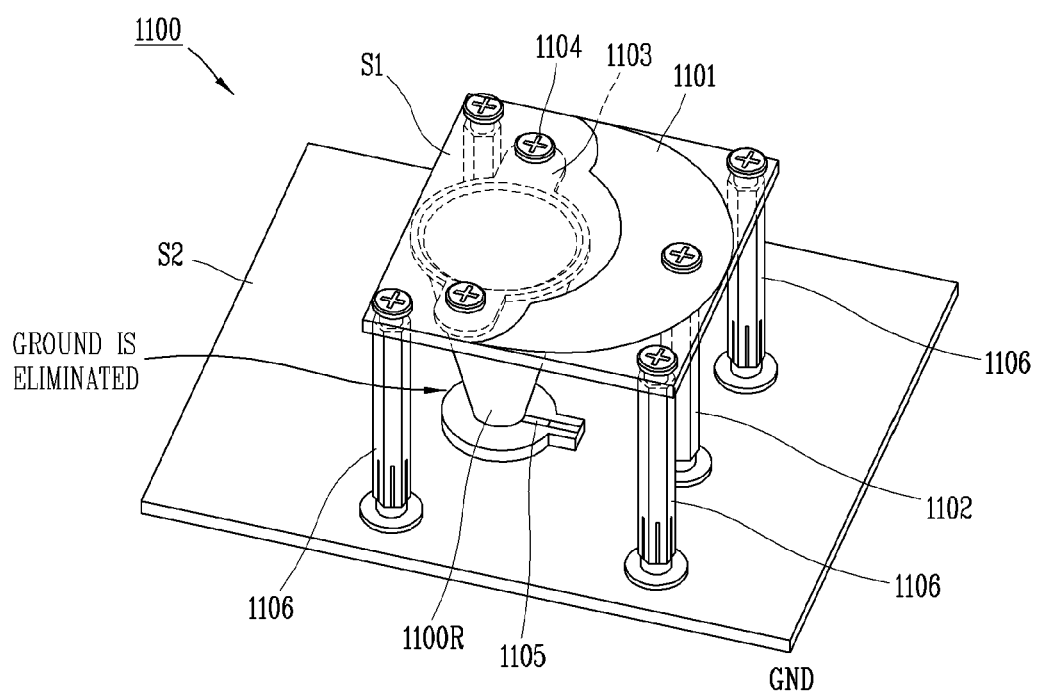
FIG. 9 is a perspective view illustrating a cone antenna in accordance with one implementation.

The antenna system may further include a plurality of cone antennas 1200 that can be connected to the second PCB (PCB2). The plurality of cone antennas 1200 may operate as second antennas in a second band corresponding to the middle band MB and the high band HB, which is higher than the first band as the low band LB. FIG. 9 is a perspective view illustrating a cone antenna in accordance with one implementation.

Referring to FIGS. 6 and 9, the plurality of cone antennas 1200 may include first to fourth cone antennas 1200-1 to 1200-4. In this regard, as illustrated in FIG. 6, the first cone antenna 1200-1 to the fourth cone antenna 1200-4 may be disposed on one side of the antenna system 100. Alternatively, the first cone antenna 1200-1 and the third cone antenna 1200-3 may be disposed on one side of the antenna system 1000, and the second cone antenna 1200-2 and the fourth cone antenna 1200-4 may be disposed on another side of the antenna system 1000.

Meanwhile, a single cone antenna constituting each of the plurality of cone antennas may include a cone radiator 1100R, a metal patch 1101, and a shorting pin 1102.

In this regard, the cone radiator 1100R may have an upper aperture and a lower aperture, and may be made of a hollow cone-shaped metal. The metal patch 1101 may be disposed with being spaced a predetermined distance apart from the cone radiator, so that a signal from the upper aperture of the cone radiator can be coupled. The shorting pin 1102 may connect the metal patch and the lower substrate S2. In this regard, the shorting pin 1102 may be disposed at only one side of the cone radiator 1100R. This may cause an asymmetrical current distribution, so as to prevent a generation of a null at a bore sight in a radiation pattern radiated through the cone antenna.

In one implementation, the baseband processor 1400 may control the transceiver circuit 1250 to perform MIMO in the low band LB through the first LB antenna LB1 and the second LB antenna LB2 corresponding to the first antennas. In this case, when signal quality of any one of the first LB antenna LB1 and the second LB antenna LB2 is less than or equal to a threshold value, the baseband processor 1400 may control the transceiver circuit 1250 to perform MIMO through the second band. The baseband processor 1400 may control the transceiver circuit 1250 to perform MIMO through two or more of the plurality of cone antennas 1200-1 to 1200-4.

Specifically, the baseband processor 1400 may perform DL-MIMO by receiving the first signal and the second signal in the low band LB through the first LB antenna LB1 and the second LB antenna LB2. In this case, when signal quality of any one of the first signal and the second signal is less than or equal to the threshold value, the baseband processor 1400 may control the transceiver circuit 1250 to perform DL-MIMO through the second band. Accordingly, the baseband processor 1400 may perform DL-MIMO by receiving the first signal and the second signal in the second band through two or more of the plurality of cone antennas 1200-1 to 1200-4.

The baseband processor 1400 may perform DL-MIMO by transmitting the first signal and the second signal in the low band LB through the first LB antenna LB1 and the second LB antenna LB2. In this case, when signal quality of any one of the first signal and the second signal is less than or equal to the threshold value, the baseband processor 1400 may control the transceiver circuit 1250 to perform UL-MIMO through the second band. Accordingly, the baseband processor 1400 may perform UL-MIMO by receiving the first signal and the second signal in the second band through two or more of the plurality of cone antennas 1200-1 to 1200-4.

In one implementation, the baseband processor 1400 may be cooperatively connected to the transceiver circuit 1250 to control the transceiver circuit 1250. The baseband processor 1400 may control the transceiver circuit 1250 to perform MIMO through the first antenna LB1, LB2 in the first frequency band. Also, the baseband processor 1400 may control the transceiver circuit 1250 to perform MIMO through the plurality of cone antennas 1200-1 to 1200-4 corresponding to the second antennas 1200 in the second frequency band.

When quality of a signal received through the first antenna 1100 is lower than or equal to a threshold value, the baseband processor 1400 may control the signal to be radiated through the second antenna 1200. To this end, the baseband processor 1400 may control the transceiver circuit 1250 to perform MIMO through the second antenna 1200 in the second frequency band.

In one implementation, the baseband processor 1400 may perform MIMO through different antennas in the low band LB to improve isolation between MIMO streams. In this regard, the baseband processor 1400 may perform MIMO in the first band through at least one of the first LB antenna LB1 and the second LB antenna LB2 and at least one of the plurality of cone antennas 1200-1 to 1200-4.

The plurality of cone antennas 1200-1 to 1200-4 may operate even in the low band LB as well as the middle band MB and the high band HB. In this case, the baseband processor 1400 may request a base station to allocate a frequency higher than a predetermined frequency among frequency resources in the low band LB. Accordingly, even when characteristics of the plurality of cone antennas 1200-1 to 1200-4 are deteriorated at a frequency lower than the predetermined frequency in the low band LB, a frequency resource higher than the predetermined frequency can be allocated and the deterioration of the antenna characteristics can be prevented.

Specifically, the baseband processor 1400 may perform DL-MIMO by receiving the first signal and the second signal in the low band LB through the first LB antenna LB1 and the second LB antenna LB2. In this case, when signal quality of any one of the first signal and the second signal is less than or equal to the threshold value, the baseband processor 1400 may perform DL-MIMO by using different types of antennas. The baseband processor 1400 may perform the DL-MIMO by receiving a plurality of signals through at least one of the first LB antenna LB1 and the second LB antenna LB2 and at least one of the plurality of cone antennas 1200-1 to 1200-4.

On the other hand, the baseband processor 1400 may perform UL-MIMO by transmitting the first signal and the second signal in the low band LB through the first LB antenna LB1 and the second LB antenna LB2. In this case, when signal quality of any one of the first signal and the second signal is less than or equal to the threshold value, the baseband processor 1400 may perform UL-MIMO by using different types of antennas. The baseband processor 1400 may perform the UL-MIMO by transmitting a plurality of signals through at least one of the first LB antenna LB1 and the second LB antenna LB2 and at least one of the plurality of cone antennas 1200-1 to 1200-4.

In one implementation, the baseband processor 1400 may perform carrier aggregation (CA) through different frequency bands. In this regard, the first antennas corresponding to the first LB antenna LB1 and the second LB antenna LB2 may operate as radiators in the low band LB, which is the first frequency band. On the other hand, the second antennas corresponding to the plurality of cone antennas 1200-1 to 1200-4 may operate as radiators in the second frequency band higher than the first frequency band.

Accordingly, the baseband processor 1400 can receive signals in the first frequency band through at least one of the first antennas 1100 and in the second frequency band through at least one of the second antennas 1200. Therefore, the baseband processor 1400 can perform carrier aggregation (CA) to receive signals using different frequency bands.

Similar to this, the baseband processor 1400 can transmit signals in the first frequency band through at least one of the first antennas 1100 and in the second frequency band through at least one of the second antennas 1200. Therefore, the baseband processor 1400 can perform carrier aggregation (CA) to transmit signals using different frequency bands.

Figure 10A:
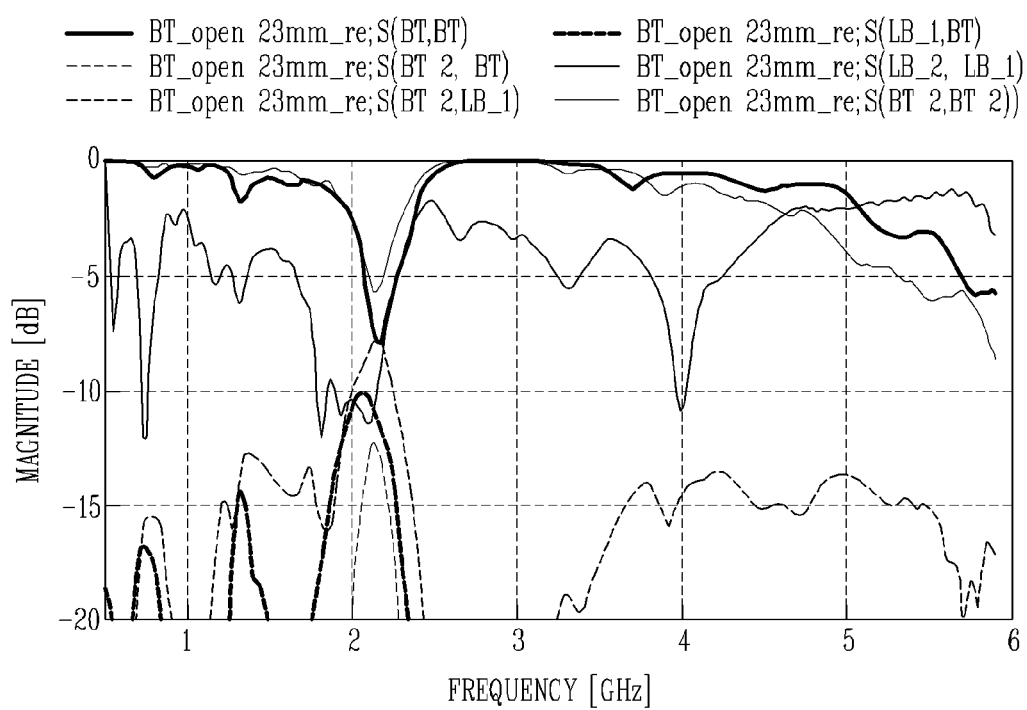
FIG. 10A is a view illustrating a reflection coefficient and isolation between an LB antenna and a slot antenna in accordance with one implementation.
Figure 10B:
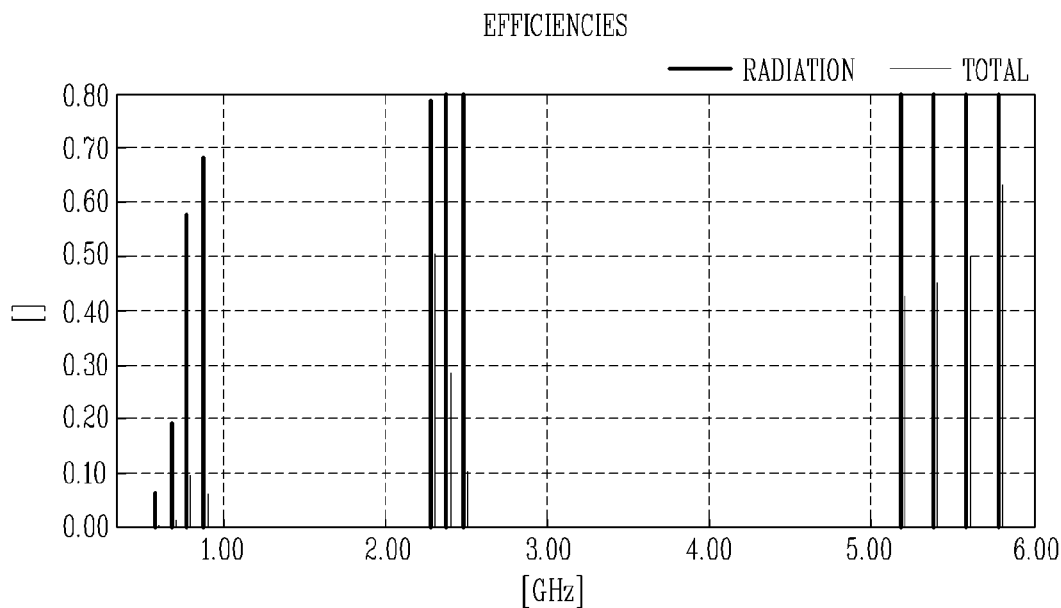
FIG. 10B is a view illustrating efficiency of a first slot antenna in accordance with one implementation.
Figure 10C:
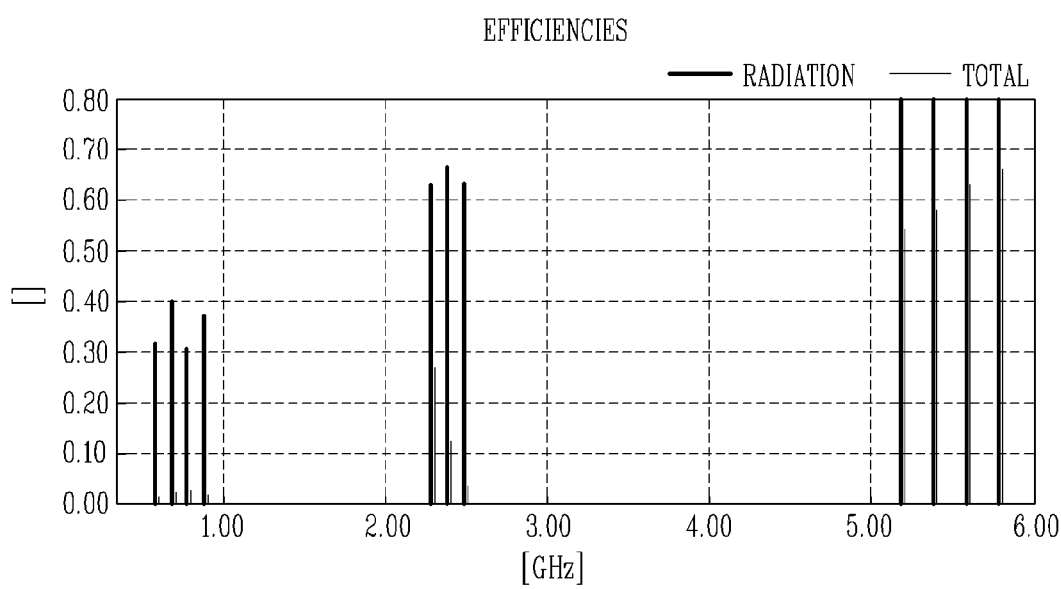
FIG. 10C is a view illustrating efficiency of a second slot antenna in accordance with one implementation.

Hereinafter, characteristics of the low band (LB) antenna and the slot antenna will be described. FIG. 10A is a view illustrating a reflection coefficient and isolation between a low-band (LB) antenna and a slot antenna in accordance with one implementation. FIG. 10B is a view illustrating efficiencies of a first slot antenna in accordance with one implementation. FIG. 10B is a view illustrating efficiencies of a second slot antenna in accordance with one implementation.

Referring to FIGS. 5, 7, and 10A, it can be seen that the LB antenna resonates in a band of about 0.6 GHz to 0.9 GHz. It can be seen that the first slot antenna SLOT1 resonates in the first WiFi band and the second WiFi band. It can also be seen that the second slot antenna SLOT2 resonates in the first WiFi band and the second WiFi band.

Meanwhile, although the first slot antenna SLOT1 is adjacent to the LB antenna, interference between the first slot antenna SLOT1 and the LB antenna may not be a problem. In this regard, the interference between the first slot antenna SLOT1 and the LB antenna may be −10 dB or less in most frequency bands. Also, reflection coefficient characteristics of the first slot antenna SLOT1 and the second slot antenna SLOT2 may be substantially similar.

Referring to FIGS. 5, 7, and 10B, it can be seen that the first slot antenna SLOT1 has very high radiation efficiency of almost 80% in the first WiFi band and the second WiFi band. Also, referring to FIGS. 5, 7, and 10B, it can be seen that the second slot antenna SLOT2 also has very high radiation efficiency of almost 80% in the first WiFi band and the second WiFi band. However, it can be seen that the radiation efficiency of the second slot antenna SLOT2 is slightly reduced to about 60% to 70% in the first WiFi band. This may result from that a length by which the second slot antenna SLOT2 is adjacent to the first LB antenna LB1 is longer than a length by which the first slot antenna SLOT1 is adjacent to the first LB antenna LB1. In this case, the second slot antenna SLOT2 may be adjacent to the first LB antenna LB1 by its entire length in a longitudinal direction. On the other hand, the first slot antenna SLOT1 may be adjacent to the first LB antenna LB1 by its partial length in the longitudinal direction. Therefore, the first slot antenna SLOT1 can be adjacent to the ground layer of the metal pattern 1110 by its remaining length in the longitudinal direction.

Meanwhile, referring to FIGS. 5, 7, 10B, and 10C, the first slot antenna SLOT1 and the second slot antenna SLOT2 may exhibit a predetermined level of radiation efficiency even in the low band LB. Therefore, the first slot antenna SLOT1 can also be used as the LB antenna at a predetermined frequency or higher in the low band LB. The second slot antenna SLOT2 can also be used as the LB antenna at a predetermined frequency or lower in the low band LB.

However, referring to FIGS. 5, 7, and 10A, the first slot antenna SLOT1 and the second slot antenna SLOT2 may not exhibit resonance characteristics. Accordingly, referring to FIGS. 5, 7, 10B, and 10C, the total efficiency of the first slot antenna SLOT1 and the second slot antenna SLOT2 may have a low value. Therefore, in order to use the first slot antenna SLOT1 and the second slot antenna SLOT2 even as LB antennas, a separate impedance matching circuit may be additionally required in the low band LB.

As described above, in addition to the LB antenna and the WiFi-band antenna, an antenna operating in the middle band MB and the high band HB need to be mounted on the vehicle. In this regard, the antenna operating in the middle band MB and the high band HB may include the plurality of cone antennas 1200-1 to 1200-4. The transceiver circuit 1250 may be controlled to radiate a signal through at least one of the first antenna 1100 and the second antenna 1200. Here, the transceiver circuit 1250 may be a radio frequency integrated chip (RFIC) including a power amplifier and a low noise amplifier.

The baseband processor 1400 may be connected to the transceiver circuit 1250 to control the transceiver circuit 1250. The baseband processor 1400 may perform MIMO through the plurality of cone antennas 1200-1 to 1200-4.

The baseband processor 1400 may control the transceiver circuit 1250 to perform MIMO through the first antennas LB1 and LB2 in the first frequency band. Also, the baseband processor 1400 may control the transceiver circuit 1250 to perform MIMO through the plurality of cone antennas 1200-1 to 1200-4 corresponding to the second antenna 1200 in the second frequency band.

In one example, the baseband processor 1400 may perform MIMO in the first frequency band through the first antenna 1100 and at least one of the plurality of cone antennas 1200-1 to 1200-4. Therefore, the antenna system can perform MIMO in the low band LB through different types of antennas, thereby reducing interference between MIMO streams. In this regard, a distance between antennas for performing MIMO may be set to be at least 5 times of an operating frequency.

However, the interference between MIMO streams can be reduced even by the interval between adjacent antennas by using different types of antennas, that is, the first antenna and the second antenna including the cone radiators.

In another example, the baseband processor 1400 may be configured to perform carrier aggregation (CA). In this regard, the first antenna 1100 may operate as a radiator in the low band LB that is the first frequency band, and the second antenna 1200 may operate as a radiator in the second frequency band that is higher than the first frequency band.

Therefore, the baseband processor 1400 may control the transceiver circuit 1250 to receive a first signal of the first frequency band through the first antenna 1100 and a second signal of the second frequency band through the second antenna 1200. Also, the baseband processor 1400 may control the transceiver circuit 1250 to transmit the first signal of the first frequency band through the first antenna 1100 and the second signal of the second frequency band through the second antenna 1200. Accordingly, the baseband processor 1400 can control the transceiver circuit 1250 to perform carrier aggregation (CA).

The foregoing description has been given of the antenna system 1000 that can be mounted in the vehicle according to one aspect. Hereinafter, a vehicle equipped with an antenna system 1000 according to another aspect will be described. In this regard, the foregoing description of the antenna system may also be applied to the vehicle, and the description of the vehicle in which the antenna system is mounted may also be applied to the aforementioned antenna system.

Figure 11:
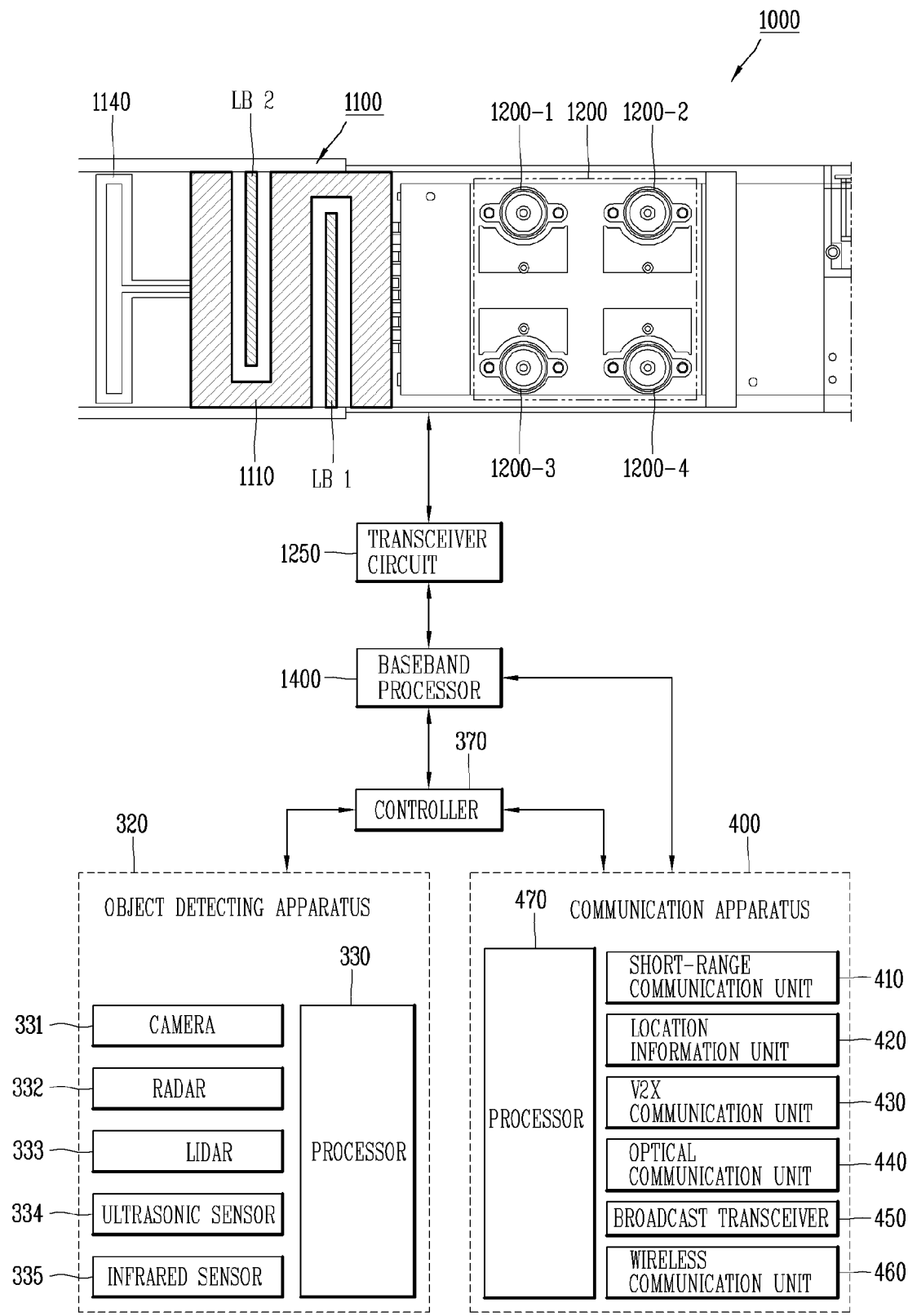
FIG. 11 is a view illustrating a configuration of a vehicle having an antenna system according to one example.

FIG. 11 is a view illustrating a configuration of a vehicle having an antenna system according to one example. Referring to FIGS. 1 to 11, a vehicle 300 may include an antenna system 1000 and a telematics module TCU. The telematics module TCU may include various components in addition to the object detecting apparatus 320 as illustrated in FIGS. 3 and 11.

The antenna system mounted in the vehicle may include the transceiver circuit 1250 for controlling a signal to be radiated through at least one of the first antenna 1100 and the second antenna 1200. In addition, the antenna system mounted in the vehicle may further include a baseband processor 1400 configured to perform communication with at least one of an adjacent vehicle, a Road Side Unit (RSU), and a base station through the transceiver circuit 1250.

Meanwhile, when it is necessary to simultaneously receive information from various entities such as an adjacent vehicle, RSU, or base station for autonomous driving, etc., a broad reception can be allowed through MIMO. Accordingly, the vehicle can receive different information from various entities at the same time to improve a communication capacity. This can improve the communication capacity of the vehicle through the MIMO without a bandwidth extension.

Alternatively, the vehicle may simultaneously receive the same information from various entities, so as to improve reliability for surrounding information and reduce latency. Accordingly, URLLC (Ultra Reliable Low Latency Communication) can be performed in the vehicle and the vehicle can operate as a URLLC UE. To this end, a base station performing scheduling may preferentially allocate a time slot for the vehicle operating as the URLLC UE. For this, some of specific time-frequency resources already allocated to other UEs may be punctured.

In one implementation, the baseband processor 1400 may perform MIMO through the first antenna 1100 and at least one of the plurality of cone antennas 1200-1 to 1200-4 in the first frequency band. Therefore, MIMO can be performed using different types of antennas spaced apart from each other by a sufficient distance. This can improve isolation between first and second signals within the same band.

The first antenna 1100 of the antenna system may operate as a radiator in the low band LB, which is the first frequency band. Also, the second antenna 1200 may operate as a radiator in the second frequency band higher than the first frequency band. Accordingly, the baseband processor 1400 may control the transceiver circuit 1250 to receive the first signal of the first frequency band through the first antenna 1100 and the second signal of the second frequency band through the second antenna 1200. Therefore, the baseband processor 1400 can perform carrier aggregation (CA) through a band in which the first frequency band and the second frequency band are combined with each other. When it is necessary to receive a large amount of data for autonomous driving and the like, a broadband reception can be allowed through the CA.

Accordingly, eMBB (Enhanced Mobile Broad Band) communication can be performed in the vehicle and the vehicle can operate as an eMBB UE. To this end, a base station performing scheduling may preferentially allocate broadband frequency resources for the vehicle operating as the eMBB UE. For this purpose, CA may be performed on extra frequency bands except for frequency resources already allocated to other UEs.

The broadband antenna system according to the present disclosure may be mounted in the vehicle in the structure illustrated in FIGS. 2A to 2C. That is, the broadband antenna system mounted to the vehicle may be mounted on a roof of the vehicle, inside the roof, or inside a roof frame, as illustrated in FIGS. 2A to 2C.

FIG. 11 is a view illustrating a configuration of a vehicle having an antenna system according to one example. Referring to FIG. 14, the vehicle 300 in which the broadband antenna system is mounted may have the antenna system 1000 mounted thereto. The antenna system 1000 may perform short-range communication, wireless communication, V2X communication, and the like by itself or through the communication apparatus 400. To this end, the baseband processor 1400 may be configured to receive signals from or transmit signals to adjacent vehicles, RSUs, and base stations through the antenna system 1000.

Alternatively, the baseband processor 1400 may be configured to receive signals from or transmit signals to adjacent vehicles, RSUs, and base stations through the communication apparatus 400. Here, the information related to adjacent objects may be acquired through the object detecting apparatus 320, such as the camera 331, the radar 332, the LiDar 333, and the sensors 334 and 335 of the vehicle 300.

Alternatively, the baseband processor 1400 may be configured to receive signals from or transmit signals to adjacent vehicles, RSUs, and base stations through the communication apparatus 400 and the antenna system 1000.

Referring to FIGS. 1 to 11, the vehicle 300 including the antenna system 1000 may include the first antenna 1100, the second antenna 1200, the transceiver circuit 1250, and the baseband processor 1400.

The baseband processor 1400 may control the transceiver circuit 1250 to receive the first signal of the first frequency band through the first antenna 1100 and the second signal of the second frequency band through the second antenna 1200. Therefore, the baseband processor 1400 can perform carrier aggregation (CA) through the first frequency band and the second frequency band.

The transceiver circuit 1250 may be controlled to radiate a signal through at least one of the first antenna and the second antenna. The baseband processor 1400 may perform communication with at least one of an adjacent vehicle, a Road Side Unit (RSU), and a base station through the transceiver circuit 1250.

As aforementioned, the first antenna 1100 may operate as a radiator in the low band LB that is the first frequency band, and the second antenna 1200 may operate as a radiator in the second frequency band that is higher than the first frequency band. The baseband processor 1400 may control the transceiver circuit 1250 to receive the first signal of the first frequency band from a first entity through the first antenna 1100 and the second signal of the second frequency band from a second entity through the second antenna 1200. Accordingly, the baseband processor 1400 can perform communication with a base station as the first entity and V2V communication with another vehicle as the second entity.

In the above, the antenna system mounted on the vehicle and the vehicle equipped with the antenna system have been described. Hereinafter, technical effects of an antenna system mounted on a vehicle and a vehicle equipped with the antenna system will be described.

According to the present disclosure, a slot antenna can be advantageously implemented by using a slot region between different substrates in the antenna system.

In addition, at least one slot antenna can be advantageously implemented by utilizing an existing space without extending a separate antenna space in the antenna system mounted on the vehicle according to the present disclosure.

Also, an LB antenna with a low-profile structure can be implemented in the antenna system mounted on the vehicle.

Also, radiation efficiency can be improved while the LB antenna can operate in a broad frequency band in the antenna system mounted on the vehicle.

In addition, interference between different antennas can be reduced in the antenna system mounted on the vehicle.

According to an implementation, a structure for mounting an antenna system, which can operate in a broad frequency band, to a vehicle can be provided to support various communication systems by implementing a low band (LB) antenna and other antennas in one antenna module.

According to an implementation, the antenna system can be optimized with different antennas in the low band LB and other bands. This can result in arranging the antenna system with optimal configuration and performance in a roof frame of the vehicle.

According to the present disclosure, the antenna system of the vehicle can implement MIMO and diversity operations using a plurality of antennas in specific bands.

Further scope of applicability of the present invention will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

The foregoing description has been given of the antenna system having the plurality of antennas, and the vehicle having the same. Hereinafter, a description will be given of an antenna system including a plurality of antennas, a vehicle having the antenna system, and a wireless communication system including a base station. In this regard, FIG. 12 is a block diagram illustrating a wireless communication system that is applicable to methods proposed herein.

Figure 12:
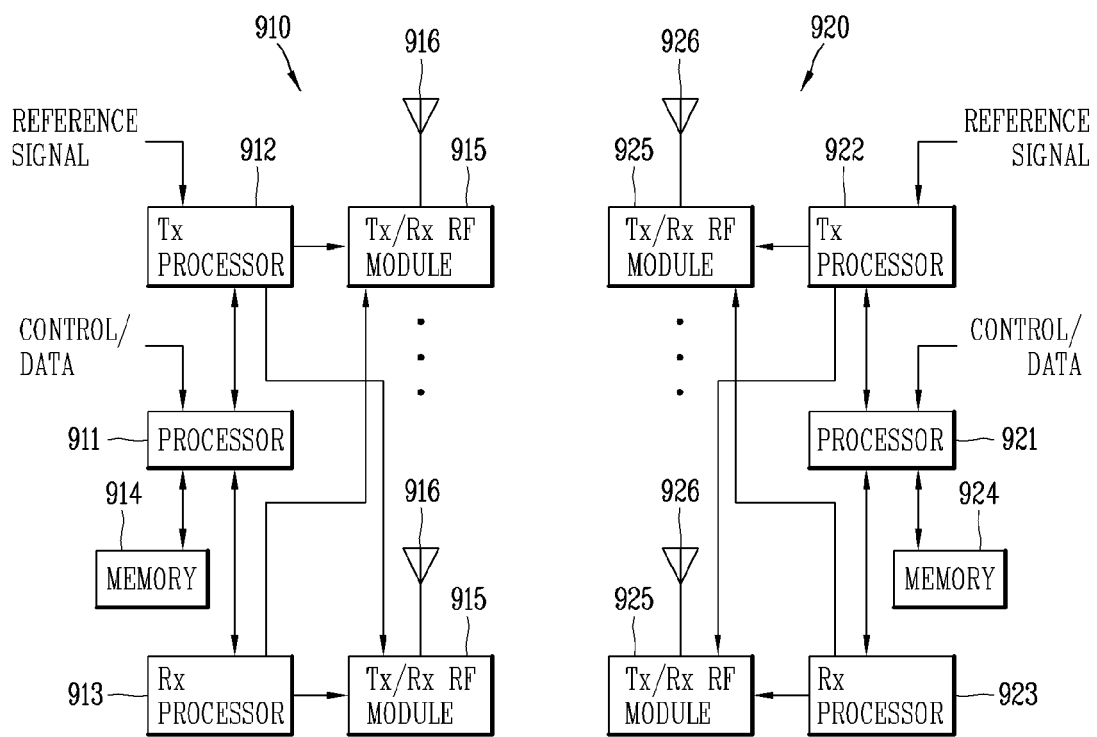
FIG. 12 is an exemplary block diagram of a wireless communication system that is applicable to methods proposed in the present disclosure.

Referring to FIG. 12, the wireless communication system may include a first communication device 910 and/or a second communication device 920. The term 'A and/or B' may be interpreted as having the same meaning as 'including at least one of A or B'. The first communication device may denote a base station and the second communication device may denote a terminal (or the first communication device may denote the terminal and the second communication device may denote the base station).

In this regard, a 5G base station may be the first communication device and a communication relay may be the second communication device. Also, the communication relay may be the first communication device and the 5G base station may be the second communication device.

On the other hand, the communication relay may be the first communication device and a 5G UE may be the second communication device. Also, the 5G UE may be the first communication device and the communication relay may be the second communication device.

The base station (BS) may be replaced with a term, such as a fixed station, a Node B, an evolved-Node B (eNB), a next generation Node B (gNB), a base transceiver system (BTS), an access point (AP), or a general NB (gNB), a 5G system, a network, an AI system, a road side unit (RSU), a robot or the like. In addition, the terminal may be fixed or have mobility, and may be replaced with a term, such as user equipment (UE), a mobile station (MS), a user terminal (UT), a mobile subscriber station (MSS), a subscriber station (SS), an advanced mobile station (AMS), a wireless terminal (WT), a machine-type Communication (MTC) device, a machine-to-machine (M2M) device, a device-to-device (D2D) device, a vehicle, a robot, an AI module, or the like.

The first communication device and the second communication device each may include a processor 911, 921, a memory 914, 924, one or more Tx/Rx radio frequency modules 915, 925, a Tx processor 912, 922, an Rx processor 913, 923, and an antenna 916, 926. The processor may implement the aforementioned functions, processes, and/or methods. More specifically, in DL (communication from the first communication device to the second communication device), an upper layer packet from a core network may be provided to the processor 911. The processor may implement the function of an L2 layer. In DL, the processor may provide multiplexing between a logical channel and a transport channel and radio resource allocation to the second communication device 920, and may be responsible for signaling to the second communication device. The Tx processor 912 may implement various signal processing functions for an L1 layer (i.e., a physical layer). The signal processing function may facilitate forward error correction (FEC) in the second communication device, and include coding and interleaving. Encoded and modulated symbols may be divided into parallel streams. Each stream may be mapped to an OFDM subcarrier, multiplexed with a reference signal (RS) in a time and/or frequency domain, and combined together using an Inverse Fast Fourier Transform (IFFT) to create a physical channel carrying a time-domain OFDMA symbol stream. The OFDM stream may be spatially precoded to generate multiple spatial streams. Each spatial stream may be provided to the different antenna 916 via the separate Tx/Rx module (or transceiver) 915. Each Tx/Rx module may modulate an RF carrier into a spatial stream for transmission. The second communication device may receive a signal through the antenna 926 of each Tx/Rx module (or transceiver) 925. Each Tx/Rx module may recover information modulated to the RF carrier, and provide it to the RX processor 923. The RX processor may implement various signal processing functions of the layer 1. The RX processor may perform spatial processing with respect to information to recover an arbitrary spatial stream destined for the second communication device. If multiple spatial streams are destined for the second communication device, they may be combined into a single OFDMA symbol stream by plural RX processors. The RX processor may transform the OFDMA symbol stream from a time domain to a frequency domain by using Fast Fourier Transform (FFT). A frequency domain signal may include an individual OFDMA symbol stream for each subcarrier of the OFDM signal. Symbols on each subcarrier and a reference signal may be recovered and demodulated by determining the most probable signal placement points transmitted by the first communication device. These soft decisions may be based on channel estimate values. The soft decisions may be decoded and deinterleaved to recover data and control signal originally transmitted by the first communication device on the physical channel. The corresponding data and control signal may then be provided to the processor 921.

UL (communication from the second communication device to the first communication device) may be processed in the first communication device 910 in a manner similar to that described with respect to the receiver function in the second communication device 920. Each Tx/Rx module 925 may receive a signal via the antenna 926. Each Tx/Rx module may provide the RF carrier and information to the RX processor 923. The processor 921 may be associated with the memory 924 that stores program code and data. The memory may be referred to as a computer-readable medium.

In relation to the aforementioned present disclosure, design and operations of a plurality of antennas of an antenna system mounted on a vehicle and a configuration performing the control of those antennas can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. An antenna system mounted on a vehicle, the system comprising:
    a first printed circuit board (PCB) having a metal pattern and a dielectric region;
    a second PCB on which a plurality of antennas are disposed; and
    a slot antenna configured to radiate a signal through a slot region generated adjacent a junction portion between the first PCB and the second PCB,
    wherein the slot region of the slot antenna is defined perpendicular to the first PCB and the second PCB.

2. The antenna system of claim 1, wherein the slot antenna comprises a plurality of slot antennas separated by a second metal pattern that vertically connects a metal pattern of the first PCB and a metal pattern of the second PCB.

3. The antenna system of claim 1, wherein the slot antenna comprises:
    a first slot antenna disposed in a first slot region defined at one side of the second metal pattern; and
    a second slot antenna disposed in a second slot region defined at another side of the second metal pattern.

4. The antenna system of claim 3, wherein the first slot antenna comprises:
    a first filter part configured to connect one end portion of the metal pattern of the first PCB and one end portion of the metal pattern of the second PCB; and
    a first feeder configured to feed the first slot region at one point between the first filter part and the second metal pattern.

5. The antenna system of claim 3, wherein the second slot antenna comprises:
    a second filter part configured to connect another end portion of the metal pattern of the first PCB and another end portion of the metal pattern of the second PCB; and
    a second feeder configured to feed the second slot region at one point between the second filter part and the second metal pattern.

6. The antenna system of claim 5, wherein each of the first and second filter parts comprises:
    an inductor configured to connect the one end portion of the metal pattern of the first PCB and the one end portion of the metal pattern of the second PCB; and
    a capacitor configured to connect the one end portion of the metal pattern of the first PCB and the one end portion of the metal pattern of the second PCB.

7. The antenna system of claim 6, further comprising:
    a transceiver circuit configured to control a signal to be radiated through at least one of the first slot antenna and the second slot antenna; and
    a baseband processor cooperatively coupled to the transceiver circuit and configured to control an operating frequency band of the slot antenna through the transceiver circuit.

8. The antenna system of claim 7, wherein the baseband processor controls one of the inductor and the capacitor to be connected between the metal pattern of the first PCB and the metal pattern of the second PCB, so that the slot antenna resonates in a first WiFi band or a second WiFi band.

9. The antenna system of claim 1, wherein the first PCB is implemented as a flexible printed circuit board (FPCB),
    wherein the FPCB comprises a first low-band (LB) antenna and a second LB antenna configured to operate in a first band that is a low band, and
    wherein the antenna system further comprises:
    a transceiver circuit configured to radiate a signal in the first band through at least one of the first LB antenna and the second LB antenna; and
    a baseband processor cooperatively coupled to the transceiver circuit, and configured to control the transceiver circuit to perform multiple-input and multi-output (MIMO) through the first LB antenna and the second LB antenna.

10. The antenna system of claim 9, wherein each of the first LB antenna and the second LB antenna further comprises:
    a first radiator disposed inside a first dielectric region having a predetermined width and length; and
    a second radiator disposed within a second dielectric region having a predetermined width and length,
    wherein the first radiator and the second radiator are radiators each generated from a different side surface of the metal pattern to have a predetermined width and length, and
    wherein the first radiator and the second radiator formed in a symmetrical shape from the different side surfaces improve isolation between the first LB antenna and the second LB antenna.

11. The antenna system of claim 10, wherein an end portion of the first radiator is spaced apart from an end portion of the first dielectric region by a predetermined distance, and
    wherein an end portion of the second radiator is spaced apart from an end portion of the second dielectric region by a predetermined distance.

12. The antenna system of claim 9, further comprising a Remote Keyless Entry (RKE) antenna disposed to be spaced apart from the metal pattern of the first PCB, and having one end connected to a feeding line and another end connected to a ground to form a closed loop.

13. The antenna system of claim 12, wherein a plurality of cone antennas connected to the second PCB operate as second antennas in a second band corresponding to a middle band (MB) and a high band (HB), the second band being higher than the first band, and
    wherein each of the plurality of cone antennas comprises:
    a cone radiator having an upper aperture and a lower aperture;
    a metal patch disposed to be spaced apart from the cone radiator by a predetermined distance to couple a signal from the upper aperture of the cone radiator; and
    a shorting pin configured to connect the metal patch and a lower substrate.

14. The antenna system of claim 13, wherein the baseband processor controls the transceiver circuit to perform MIMO through two or more of the plurality of cone antennas in the second band when quality of a signal received through the first LB antenna and the second LB antenna corresponding to first antennas is less than or equal to a threshold value.

15. The antenna system of claim 13, wherein the baseband processor performs MIMO in the first band through at least one of the first LB antenna and the second LB antenna and at least one of the plurality of cone antennas.

16. The antenna system of claim 13, wherein the first antennas corresponding to the first LB antenna and the second LB antenna operate as radiators in the low band that is a first frequency band,
    wherein the second antennas operate as radiators in a second frequency band higher than the first frequency band, and wherein the baseband processor performs Carrier Aggregation (CA) using the first frequency band through at least one of the first antennas and the second frequency band through at least one of the second antennas.

* * * * *